US012211497B1

(12) United States Patent
Nadig et al.

(10) Patent No.: US 12,211,497 B1
(45) Date of Patent: Jan. 28, 2025

(54) VOICE USER INTERFACE NOTIFICATION RENDERING

(71) Applicant: Amazon Technologies, Inc., Seattle, WA (US)

(72) Inventors: Vinaya Nadig, Bothell, WA (US); Samarth Bhargava, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 491 days.

(21) Appl. No.: 17/313,293

(22) Filed: May 6, 2021

(51) Int. Cl.
*G10L 15/22* (2006.01)

(52) U.S. Cl.
CPC .................................... *G10L 15/22* (2013.01)

(58) Field of Classification Search
CPC ... G10L 15/22; G10L 15/26; G10L 2015/223; G10L 25/48
See application file for complete search history.

(56) References Cited

U.S. PATENT DOCUMENTS

| | | | | |
|---|---|---|---|---|
| 9,286,910 | B1* | 3/2016 | Li | G06F 16/3329 |
| 10,074,364 | B1* | 9/2018 | Wightman | G10L 15/285 |
| 10,157,042 | B1* | 12/2018 | Jayakumar | H04R 27/00 |
| 10,347,247 | B2* | 7/2019 | Bhaya | G10L 15/1822 |
| 10,482,904 | B1* | 11/2019 | Hardie | G10L 15/22 |
| 10,652,622 | B2* | 5/2020 | Wu | H04N 21/41407 |
| 2014/0040748 | A1* | 2/2014 | Lemay | G06F 3/04817 |
| | | | | 715/728 |
| 2014/0164994 | A1* | 6/2014 | Myslinski | G06F 3/04817 |
| | | | | 715/808 |
| 2016/0104486 | A1* | 4/2016 | Penilla | G10L 15/02 |
| | | | | 704/232 |
| 2016/0337134 | A1* | 11/2016 | Robert | H04L 9/3268 |
| 2018/0061415 | A1* | 3/2018 | Penilla | G10L 15/02 |
| 2019/0196851 | A1* | 6/2019 | Penilla | G09G 5/14 |
| 2020/0126533 | A1* | 4/2020 | Doyle | G10L 15/063 |
| 2020/0152197 | A1* | 5/2020 | Penilla | H04L 67/12 |
| 2020/0243178 | A1* | 7/2020 | Sweeney | G16H 70/60 |
| 2021/0117003 | A1* | 4/2021 | Deisher | G06F 3/04842 |
| 2021/0149944 | A1* | 5/2021 | Case | G06F 16/4393 |
| 2022/0028379 | A1* | 1/2022 | Carbune | G10L 15/22 |
| 2022/0108693 | A1* | 4/2022 | Maeda | G06F 3/167 |
| 2022/0335932 | A1* | 10/2022 | Sharifi | G06F 16/90332 |

* cited by examiner

*Primary Examiner* — Mark Villena
(74) *Attorney, Agent, or Firm* — Pierce Atwood LLP

(57) ABSTRACT

Techniques for coordinating output of inferred content using various components and systems are described. A supplemental content system and a notification system may each receive inferred content to be output. When the supplemental content system or the notification system outputs the inferred content, the respective system stores a record of the output of the content in a historical output storage. Thereafter, when the other system is ready to output the inferred content, the other system may prevent the inferred content from being output based on the inferred content having already been output, as represented in the historical output storage.

18 Claims, 11 Drawing Sheets

VOICE USER INTERFACE NOTIFICATION RENDERING

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
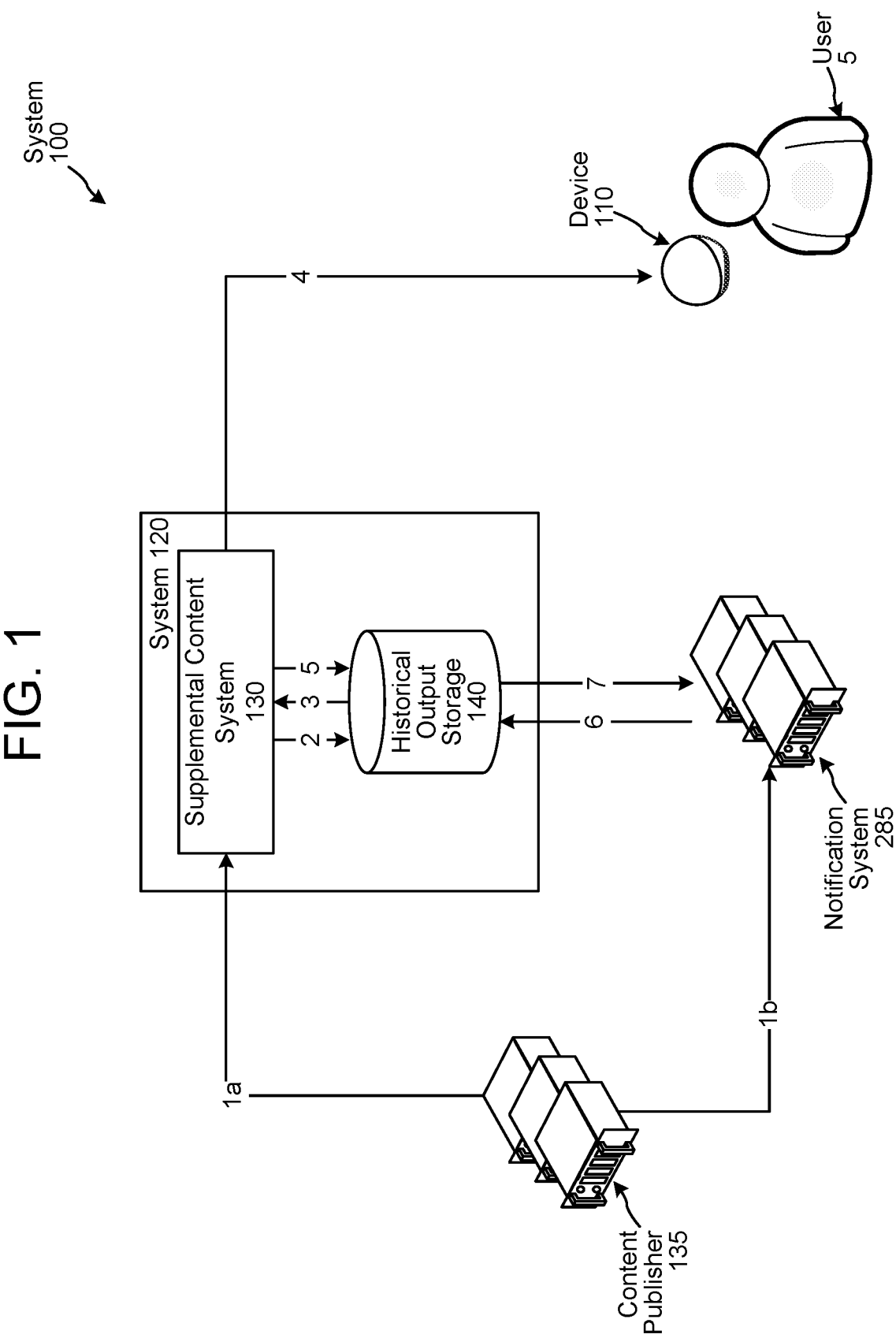
FIG. 1 is a conceptual diagram illustrating a system configured to coordinate output of inferred content using various systems, according to embodiments of the present disclosure.

A user may subscribe to receive content (e.g., corresponding to a specific topic of interest) from a publisher. Such is referred to herein as "requested content." For example, a user may subscribe to receive notification content representing a severe weather alert for a geographic location, representing a product has been delivered, indicating the user has received a new email (e.g., from a particular sender), indicating the user's food order is ready for pickup, representing an upcoming start of a calendar event, representing a sporting event score update, indicating a taxi has arrived to pick up the user, etc.

A system may use a notification system to notify a user that the user has received requested content. For example, the notification system may notify a user by causing a device (e.g., not including or being associated with a display) of the user to activate a light indicator (e.g., a light ring, light emitting diode (LED), etc.) in a particular manner (e.g., exhibit a particular color, blink in a particular manner, etc.). For further example, the notification system may notify a user by causing a device (e.g., a smart phone, tablet, smart television, or other device including or being associated with a display) of the user to display a graphical user interface (GUI) element, such as a banner, a card, or the like. As another example, the notification system may notify a user by causing a device (e.g., a smart watch, smart ring, or smart phone) of the user to vibrate in a particular manner (e.g., at a particular vibration strength, particular vibration pattern, etc.). A mechanism to notify a user of requested content may be referred to herein as a "notification." As such, the foregoing activation of the light indicator in the particular manner, display of the GUI element, and device vibration may be individually or collectively referred to as a notification.

A content publisher may also anticipate a user's needs and proactively generate content, without an explicit user request for the same, to inform the user about information that may be important/useful/relevant to the user. Such is referred to herein as "inferred content." For example, a notification publisher may, based on an electronic "wishlist" that was manually created and/or historical purchases of a user, generate inferred content recommending a product the user may be interested in purchasing. For further example, a notification publisher may generate inferred content to inform a user of a new feature/functionality of a system related to something the user has explicitly indicated, to the system, an affinity for in the past.

A system may use the notification system and/or a supplemental content system to output inferred content. For example, the notification system may notify the user of inferred content using one or more of the aforementioned techniques. In some embodiments, the supplemental content system may output inferred content as synthesized speech appended to a response to a user input. For example, a user may provide the spoken input "what is the weather." In response to the spoken input, the system may output synthesized speech corresponding to "it is sunny with a high of 85 degrees." In addition to the system outputting the foregoing synthesized speech responsive to the spoken input, the supplemental content system may output inferred content as synthesized speech such as "did you know there is a park within 5 miles of you."

The present disclosure provides, among other things, techniques for coordinating output of inferred content using various systems. For example, in some embodiments a notification system may check content already output by a supplemental content system to a user, and may not output inferred content if it was recently/previously output to the user by the supplemental content system, and vice versa. The teachings of the present disclosure, among other things, provide an improved user experience as the teachings of the present disclosure may mitigate a user undesirably receiving the same inferred content from more than one system.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to coordinate output of inferred content using various systems. Although the figures and discussion of the present disclosure illustrate certain processes in a particular order, the processes described may be performed in a different order (as well as certain processes removed or added) without departing from the present disclosure.

The system 100 may include a device 110 (local to a user 5), a notification system 285, a content publisher(s) 135, and a system 120 in communication across a network(s) 199. The network 199 may include the Internet and/or any other wide- or local-area network, and may include wired, wireless, and/or cellular network hardware. While the user 5 is illustrated as a human, it will be appreciated that the present disclosure is not limited thereto, and that the user 5 may be a non-human such as an application, bot, or the like.

As used herein, a "content publisher" refers to a computing system or component configured to send content to the notification system 285 and/or a supplemental content system 130 of the system 120. In some instances, a content publisher may be a skill. As used herein, a "skill" refers to software, that may be placed on a machine or a virtual machine (e.g., software that may be launched in a virtual instance when called), configured to process data representing a user input and perform one or more actions in response thereto. In some instances, a skill may process NLU output data (described in further detail herein below with respect to FIG. 2) to perform one or more actions responsive to a user input represented by the NLU output data. What is described herein as a skill may be referred to using different terms, such as a processing component, an application, an action, a bot, or the like.

The supplemental content system 130 receives (step 1a) inferred content from the content publisher 135. The inferred content may be proactively generated by the content publisher 135 in anticipation of the user 5's needs. In other words, without an explicit request (e.g., via a subscription) from the user 5 for the inferred content. In some embodiments, the inferred content may be associated with a user identifier of the user 5. In such embodiments, the supplemental content system 130 may store an association between the inferred content and the user identifier. In some embodiments, the inferred content may be associated with a parameter corresponding to a group of users. For example, the parameter may indicate the inferred content is to be output to users of the system 120 (described in detail below with respect to FIG. 2) that have used a particular feature of the system 120 within a past duration of time (e.g., within a past month), the inferred content is to be output to users of the system 120 that are associated with a particular geographic location, etc. In such embodiments, the supplemental content system 130 may determine the user 5 (and by extension the user identifier) corresponds to the group of users, and may thereafter store an association between the inferred content and the user identifier.

In some embodiments, the inferred content may be associated with a group identifier corresponding to a group (e.g., household) of users to which the user 5 belongs. In such embodiments, the supplemental content system 130 may store an association between the inferred content and the group identifier, and may optionally store a respective association between the inferred content and each user identifier associated with the group identifier (in other words each user in the group).

The notification system 285 may also receive (step 1b) the inferred content from the content publisher. The notification system 285 may store the inferred content in a manner similar to that described above with respect to the supplemental content system 130.

The system 120 may include a historical output storage 140 that maintains a record of previously output inferred content. For example, inferred content (e.g., natural language text and/or structured data that can undergo natural language generation processing) in the historical output storage 140 may be associated with a topic/category of the inferred content, a profile identifier (e.g., a group identifier, user identifier, etc.) with respect to which the inferred content was output, a device identifier of a device used to output the inferred content, and/or a timestamp of when the inferred content was output.

Prior to outputting the inferred content, the supplemental content system 130 may query (step 2) the historical output storage 140 to determine whether the inferred content has been output using the profile identifier, of the user 5, and/or device identifier of the device 110. The query may be agnostic as to whether the supplemental content system 130 or the notification system 285 previously output the inferred content. In the example of FIG. 1, the supplemental content system 130 may receive (step 3) a response to the query that indicates the historical output storage 140 is missing data indicating the inferred content was output suing the profile identifier and/or device identifier.

In response to receiving the response, the supplemental content system 130 may cause (step 4) the device 110 to output the inferred content. For example, the supplemental content system 130 may cause the device 110 to output synthesized speech corresponding to the inferred content.

After causing the device 110 to output the inferred content, the supplemental content system 130 may store (step 5), in the historical output storage 140, data representing the supplemental content system 130 has caused the inferred content to be output. For example, the data may include a topic/category of the inferred content, the inferred content (e.g., natural language text and/or structured data that can undergo natural language generation processing), the profile identifier (e.g., a group identifier, user identifier, etc.) with respect to which the inferred content was output, the device identifier of the device 110 used to output the inferred content, and/or a timestamp of when the inferred content was output.

Figure 6:
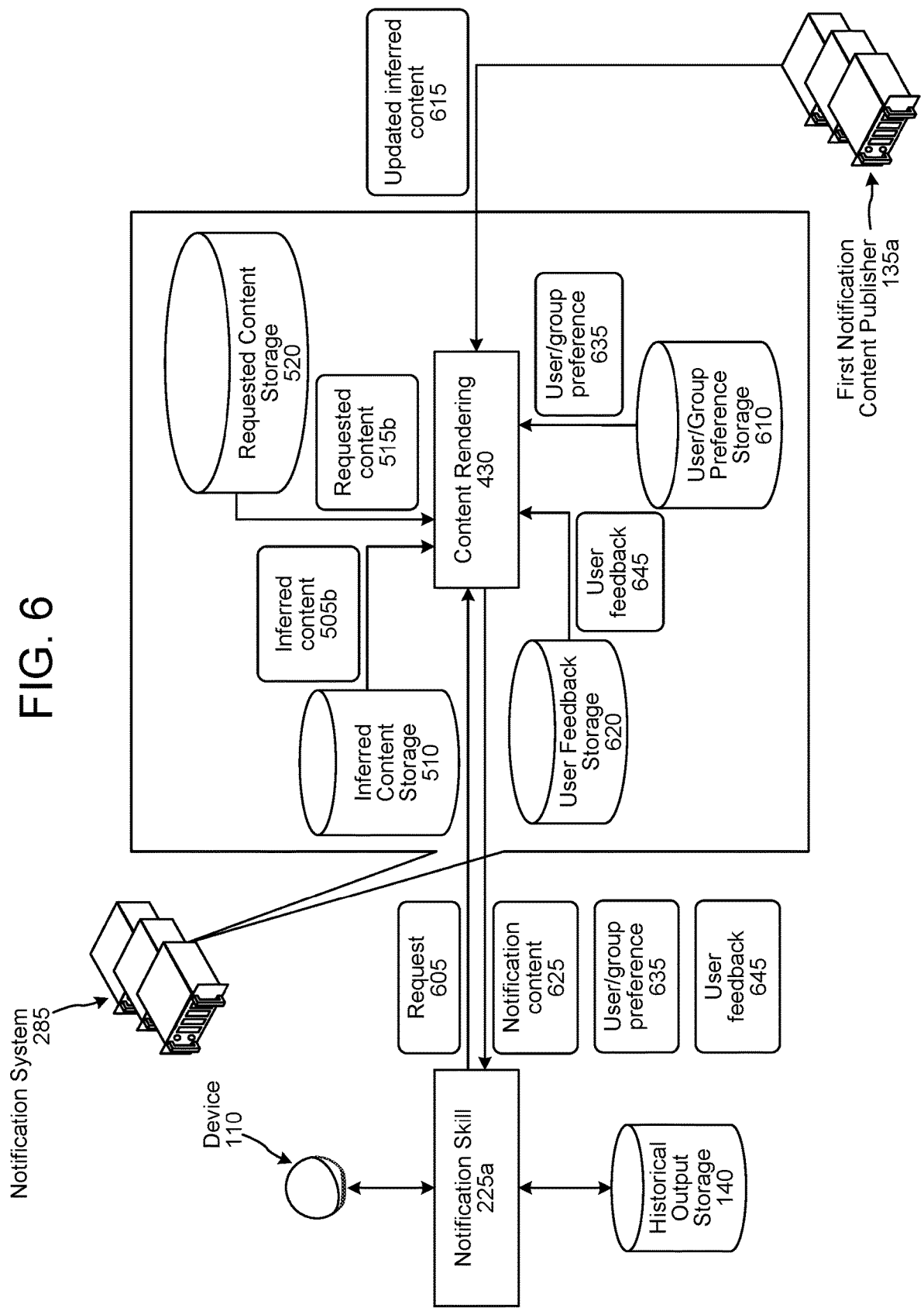
FIG. 6 is a conceptual diagram of components for outputting requested and inferred content, according to embodiments of the present disclosure.
Figure 7:
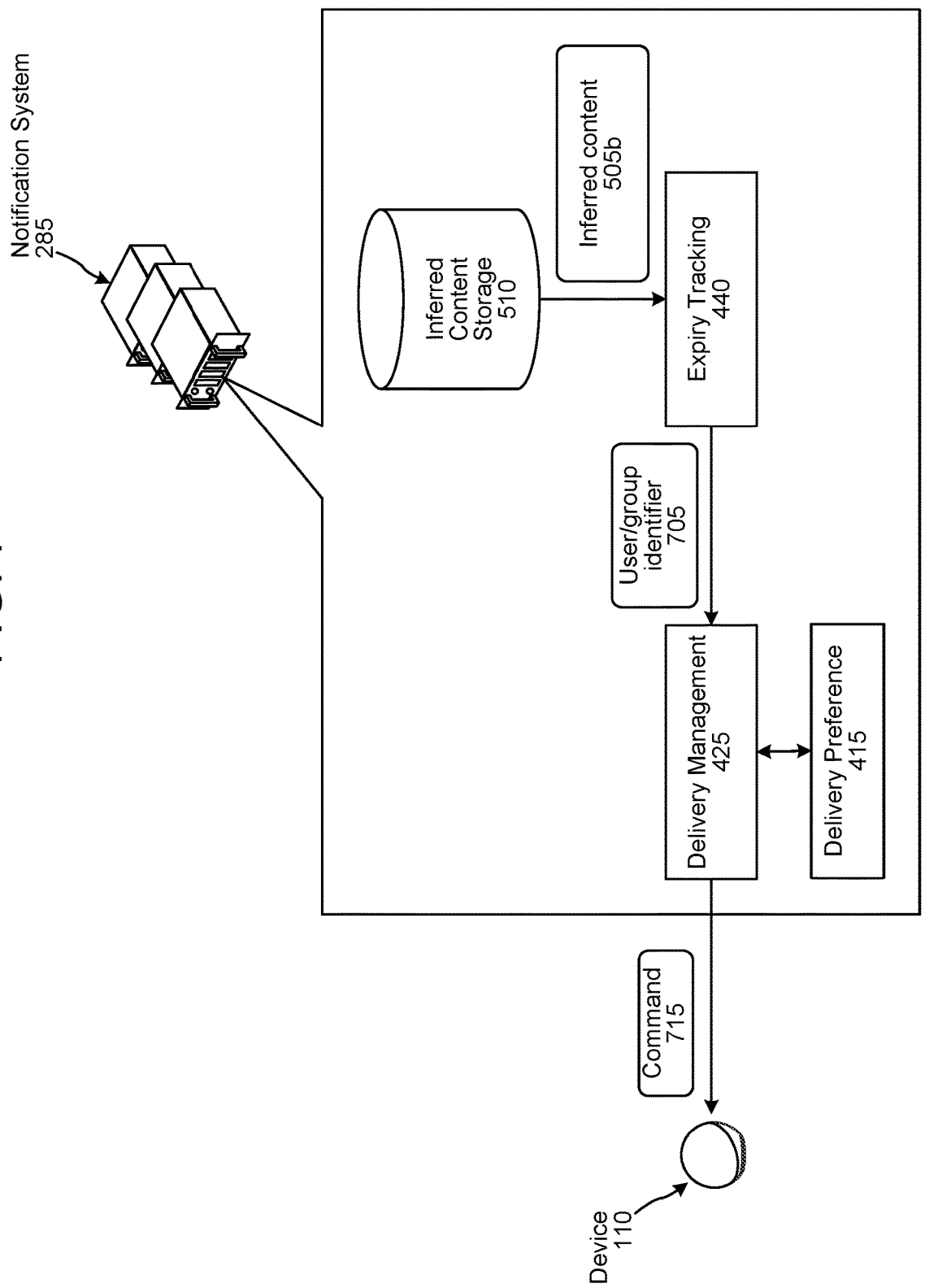
FIG. 7 is a conceptual diagram of components for outputting expiring inferred content, according to embodiments of the present disclosure.

Sometime after the supplemental content system 130 causes the data to be stored in the historical output storage 140, the notification system 285 may determine the inferred content is to be output (as described with respect to FIGS. 6-7). In response to this determination, the notification system 285 may query (step 6) the historical output storage 140 to determine whether the inferred content has been previously output using the profile identifier of the user 5 and/or a device identifier of the device 110.

In the example of FIG. 1, the notification system 285 receives (step 7), in response to the query, data representing the inferred content has already been output using the profile identifier of the user 5 and/or the device identifier of the device 110. Such response may be received in response to the historical output storage 140 including the data stored by the supplemental content system 130 at step 3.

In response to receiving the data representing the inferred content has already been output using the profile identifier and/or device identifier, the notification system 285 may determine not to output the inferred content to the user 5 again (e.g., may determine the notification system 285 is prevented from outputting the inferred content to the user 5 again), or may determine not to output the inferred content using the device 110 again (e.g., may determine the notification system 285 is prevented from outputting the inferred content using the device 110 again). As such, the historical output storage 140 enables the supplemental content system 130 and the notification system 285 to coordinate the output of the inferred content such that the user 5 does not receive the inferred content from both the supplemental content system 130 and the notification system 285 and/or the device 110 does not output the inferred content from both the supplemental content system 130 and the notification system 285.

In some embodiments, the notification system 285 may receive, in response to the query of step 6, data indicating the inferred content has been output using the profile identifier and/or device identifier, but the notification system 285 may nonetheless determine the inferred content can be output based on when the inferred content was previously output. For example, in response to the query the notification system 285 may receive a timestamp of when the inferred content was previously output using. If the notification system 285 determines the timestamp corresponds to a time at least a threshold duration in the past (e.g., at least a week ago, at least a month ago, etc.), then the notification system 285 may determine the inferred content may be output again, and may send the inferred content to the device 110 for output.

It will be appreciated that the teachings of FIG. 1 are merely illustrative and that, in some embodiments, the notification system 275 may output the inferred content and store the data in the historical output storage 140 representing the inferred content has been output using the profile identifier, and the supplemental content system 130 may thereafter determine not to output the inferred content based on the data in the historical output storage 140.

In some embodiments, the notification system 285 may first indicate the inferred content is available for output (e.g., by activating a light indicator or in some other manner as described elsewhere herein), and only output the inferred content in response to a user input requesting output of content (including but not limited to the inferred content). In such embodiments, the notification system 285 may not store data, in the historical output storage 140 indicating the inferred content has been output until the notification system 285 has output the inferred content in response to the user input. In other words, the notification system 285 may not store the foregoing data in the historical output storage 140 upon indicating the inferred content is available for output.

In some situations, the supplemental content system 130 may be prepared to output the inferred content after or while the notification system 285 indicates the inferred content is available for output, but prior to the notification system 285 receiving the user input and outputting the inferred content. In such situations, the supplemental content system 130 may query the historical output storage 140 and receive a response indicating the inferred content has yet to be output (since the notification system 285 has only indicated the inferred content is available for output but has yet to actually output the inferred content), and the supplemental content system 130 may output the inferred content to the device 110.

Figure 2:
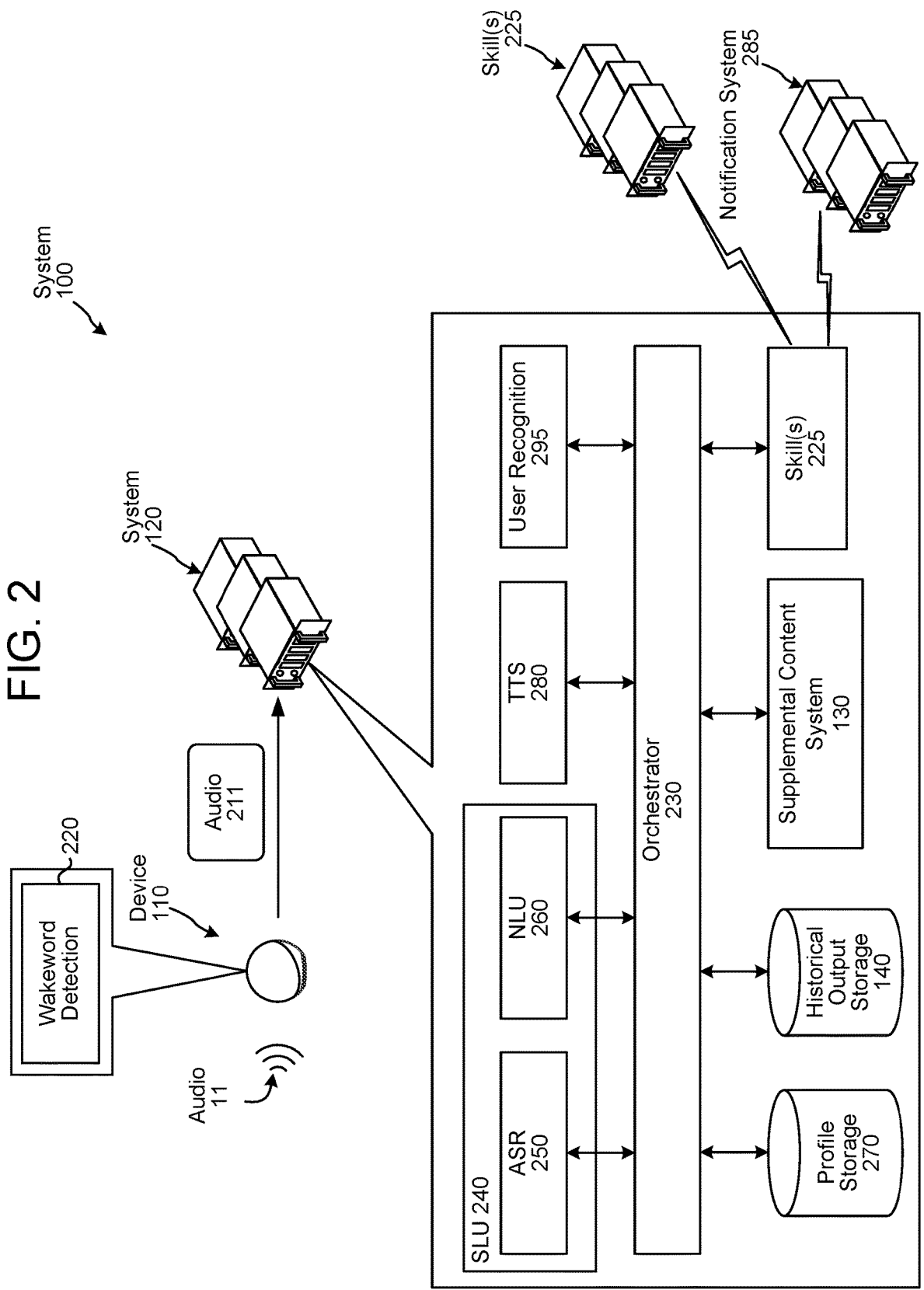
FIG. 2 is a conceptual diagram of components of the system, according to embodiments of the present disclosure.

The system 100 may operate using various components as illustrated in FIG. 2. The various components may be located on a same or different physical devices. Communication between various components may occur directly or across a network(s) 199.

A microphone or array of microphones (of or otherwise associated with the device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 220 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the system 120. The audio data 211 may include the detected wakeword, or the device 110 may remove the portion of the audio data, corresponding to the detected wakeword, prior to sending the audio data 211 to the system 120.

The system 120 may include an orchestrator component 230 configured to, among other things, coordinate data transmissions between components of the system 120. The orchestrator component 230 may receive the audio data 211 from the device 110, and send the audio data 211 to an ASR component 250.

The ASR component 250 transcribes the audio data 211 into ASR output data including one or more ASR hypotheses. An ASR hypothesis may be configured as a textual interpretation of the speech in the audio data 211, or may be configured in another manner, such as one or more tokens. Each ASR hypothesis may represent a different likely interpretation of the speech in the audio data 211. Each ASR hypothesis may be associated with a score (e.g., confidence score, probability score, or the like) representing the associated ASR hypothesis correctly represents the speech in the audio data 211.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 230. The orchestrator component 230 may send the text data or ASR output data, depending on the type of natural language input received, to a NLU component 260.

The NLU component 260 processes the ASR output data or text data to determine one or more NLU hypotheses embodied in NLU output data. The NLU component 260 may perform intent classification (IC) processing on the ASR output data or text data to determine an intent of the natural language input. An intent corresponds to an action to be performed that is responsive to the natural language input. To perform IC processing, the NLU component 260 may communicate with a database of words linked to intents. For example, a music intent database may link words and phrases such as "quiet," "volume off," and "mute" to a <Mute> intent. The NLU component 260 identifies intents by comparing words and phrases in ASR output data or text data to the words and phrases in an intents database. In some embodiments, the NLU component 260 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 260 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 260 may be linked to one or more grammar frameworks with entity types to be populated with entity values. Each entity type of a grammar framework corresponds to a portion of ASR output data or text data that the NLU component 260 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 260 may perform NER processing to identify words in ASR output data or text data as subject, object, verb, preposition, etc. based on grammar rules and/or models. Then, the NLU component 260 may perform IC processing using the identified verb to identify an intent. Thereafter, the NLU component 260 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 260 may generate NLU output data including one or more NLU hypotheses, with each NLU hypothesis including an intent and optionally one or more entity types and corresponding entity values. In some embodiments, the NLU component 260 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 250 and the NLU component 260). In at least some embodiments, the system 120 may implement a spoken language understanding (SLU) component 240 configured to process audio data 211 to determine NLU output data.

The SLU component 240 may be equivalent to a combination of the ASR component 250 and the NLU component 260. Yet, the SLU component 240 may process audio data 211 and directly determine the NLU output data, without an intermediate step of generating ASR output data. As such, the SLU component 240 may take audio data 211 representing a spoken natural language input and attempt to make a semantic interpretation of the spoken natural language input. That is, the SLU component 240 may determine a meaning associated with the spoken natural language input and then implement that meaning. For example, the SLU component 240 may interpret audio data 211 representing a spoken natural language input in order to derive a desired action. The SLU component 240 may output a most likely NLU hypothesis, or multiple NLU hypotheses associated with respective confidence or other scores (such as probability scores, etc.).

The system 120 may include a gesture detection component (not illustrated in FIG. 2). The system 120 may receive image data representing a gesture, the gesture detection component may process the image data to determine a gesture represented therein. The gesture detection component may implement art-known/industry-known gesture detection processes.

In embodiments where the system 120 receives non-image data (e.g., text data) representing a gesture, the orchestrator component 230 may be configured to determine what downstream processing is to be performed in response to the gesture.

In embodiments where the system 120 data representing a selected GUI element, the orchestrator component 230 may be configured to determine what downstream processing is to be performed in response to the GUI element selection.

The system 120 may include or otherwise communicate with one or more skills 225. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill 225 may operate in conjunction between the system 120 and other devices, such as the device 110, a restaurant electronic ordering system, a taxi electronic booking system, etc. in order to complete certain functions. Inputs to a skill 225 may come from speech processing interactions or through other interactions or input sources.

A skill 225 may be associated with a domain, a non-limiting list of which includes a smart home domain, a music domain, a video domain, a weather domain, a communications domain, a flash briefing domain, a shopping domain, and a custom domain.

The system 120 may include a TTS component 280 that generates audio data including synthesized speech. The data input to the TTS component 280 may come from a skill 225, the orchestrator component 230, or another component of the system 120.

In one method of synthesis called unit selection, the TTS component 280 matches input data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The system 120 may include a user recognition component 295. The user recognition component 295 may recognize one or more users using various data. The user recognition component 295 may take as input the audio data 211. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, retina data, etc.), received by the system 120 in correlation with a natural language input, to stored biometric data of users. The user recognition component 295 may additionally or alternatively perform user recognition by comparing image data (e.g., including a representation of at least a feature of a user), received by the system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that received the natural language input.

The user recognition component 295 determines whether a natural language input originated from a particular user. For example, the user recognition component 295 may determine a first value representing a likelihood that a natural language input originated from a first user, a second value representing a likelihood that the natural language input originated from a second user, etc. The user recognition component 295 may also determine an overall confidence regarding the accuracy of user recognition processing.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill 225, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 270 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 225 that the user has enabled. When a user enables a skill 225, the user is providing the system 120 with permission to allow the skill 225 to execute with respect to the user's natural language inputs. If a user does not enable a skill 225, the system 120 may not execute the skill 225 with respect to the user's natural language inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The system 120 may communicate with the notification system 285, which is described in detail herein below with respect to FIGS. 5-7. As illustrated, the notification system 285 may communicate with components of the system 120 via a skill 225.

Figure 3:
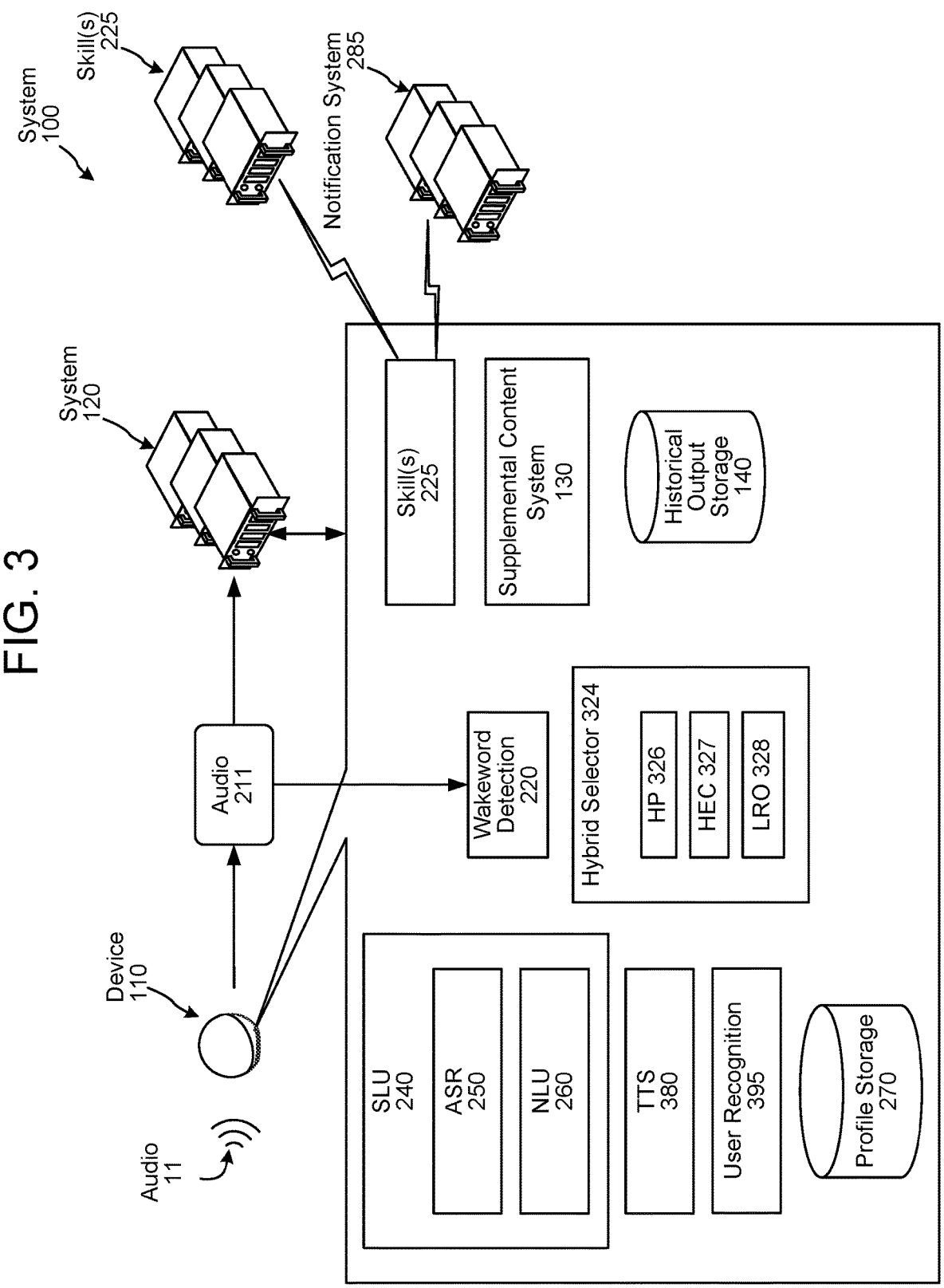
FIG. 3 is a conceptual diagram illustrating components that may be included in a device, according to embodiments of the present disclosure.

The foregoing describes illustrative components and processing of the system 120. The following describes illustrative components and processing of the device 110. As illustrated in FIG. 3, in at least some embodiments the system 120 may receive the audio data 211 from the device 110, to recognize speech corresponding to a spoken natural language in the received audio data 211, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., an audio or video call) between the user 5 and another user, and so on.

As noted with respect to FIG. 2, the device 110 may include a wakeword detection component 220 configured to used to detect a wakeword (e.g., "Alexa") that indicates to the device 110 that the audio data 211 is to be processed for determining NLU output data. In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or an on-device ASR component 250. The wakeword detection component 220 may also send an indication, to the hybrid selector 324, representing a wakeword was not detected. In response to receiving such an indication, the hybrid selector 324 may refrain from sending the audio data 211 to the system 120, and may prevent the on-device ASR component 250 from processing the audio data 211. In this situation, the audio data 211 can be discarded.

The device 110 may conduct its own speech processing using on-device language processing components (such as an on-device SLU component 240, an on-device ASR component 250, and/or an on-device NLU component 260) similar to the manner discussed above with respect to the system-implemented SLU component 240, ASR component 250, and NLU component 260. The device 110 may also internally include, or otherwise have access to, other components such as one or more skills 225, a user recognition component 295 (configured to process in a similar manner to the system-implemented user recognition component 295), profile storage 270 (configured to store similar profile data to the system-implemented profile storage 270), a gesture detection component (similar to that of the system 120 described above), the supplemental content system 130, the historical output storage 140, and other components. In at least some embodiments, the on-device profile storage 270 may only store profile data for a user or group of users specifically associated with the device 110. The device 110 may communicate with the notification system 285, for example via a skill 225 implemented by the device 110.

In at least some embodiments, the on-device language processing components may not have the same capabilities as the language processing components implemented by the system 120. For example, the on-device language processing components may be configured to handle only a subset of the natural language inputs that may be handled by the system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the on-device ASR component 250 about the availability of the audio data 211, and to otherwise initiate the operations of on-device language processing when the audio data 211 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device ASR component 250 by routing the audio data 211 through the HEC 327 of the hybrid selector 324, whereby the LRO 328 notifies the on-device ASR component 250 of the audio data 211. At this point, the hybrid selector 324 may wait for response data from either or both the system 120 and/or the on-device language processing components. However, the disclosure is not limited thereto, and in some examples the hybrid selector 324 may send the audio data 211 only to the on-device ASR component 250 without departing from the disclosure. For example, the device 110 may process the audio data 211 on-device without sending the audio data 211 to the system 120.

The on-device ASR component 250 is configured to receive the audio data 211 from the hybrid selector 324, and to recognize speech in the audio data 211, and the on-device NLU component 260 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 260) may be selected as usable to respond to a natural language input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 5.

The device 110 and/or the system 120 may associate a unique identifier with each natural language input. The device 110 may include the unique identifier when sending the audio data 211 to the system 120, and the response data from the system 120 may include the unique identifier to identify to which natural language input the response data corresponds.

In at least some embodiments, the device 110 may include one or more skills 225 that may process similarly to the system-implemented skill(s) 225. The skill(s) 225 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 4:
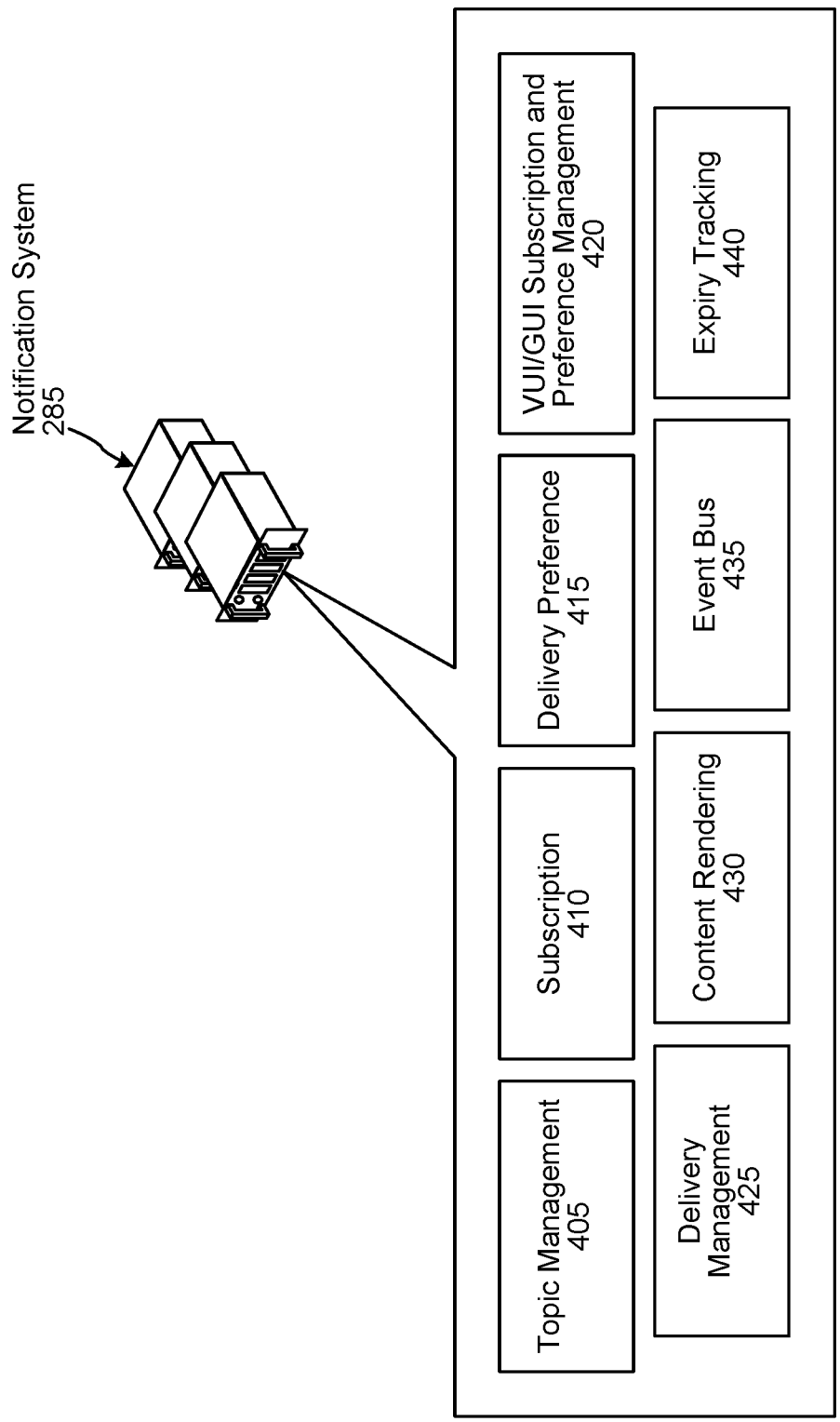
FIG. 4 is a conceptual diagram of components of a notification system, according to embodiments of the present disclosure.

Referring now to FIG. 4, components of the notification system 285 are described. The notification system 285 may include a topic management component 405, a subscription component 410, a delivery preference component 415, a VUI/GUI subscription and preference management component 420, a delivery management component 425, a content rendering component 430, an event bus 435, an expiry tracking component 440, and/or other components.

The topic management component 405 may include a repository of notification topics supported by the notification system 285. Example notification topics include, but are not limited to, meeting start time notifications, new email notifications, sporting event update notifications, weather notifications, taxi arrival notifications, product delivery notifications, and media (e.g., television) start time notifications.

The topic management component 405 may also include a repository of schemas for notification topics. A schema may define the structure data is to take for a particular notification topic. For example, a schema may indicate data, corresponding to a particular notification topic as received from a content publisher 135, is to include notification content and one or more particular types of metadata (e.g., an identifier of the content publisher, whether the notification content is requested or inferred, a topic of the notification content, how the content publisher prefers the notification content be indicated to a user(s), how the content publisher prefers the notification content be output to a user(s), a validity duration of the notification content, etc.). In some embodiments, each schema may be associated with only one notification topic, and each notification topic may be associated with only one schema. In other embodiments, a schema may be associated with more than one notification topic and/or a notification topic may be associated with more than one schema.

The topic management component 405 may include one or more application program interfaces (APIs). The topic management component 405 may include one or more APIs for content publishers 135 to get a schema. For example, the topic management component 405 may be configured such that each schema is associated with a respective, different API. The topic management component 405 may also include one or more APIs that enable the topic management component 405 to fetch the one or more topics supported by a content publisher 135.

The subscription component 410 may manage all requested notification subscriptions. The subscription component 410 may communicate with a subscription storage (not illustrated) containing all requested notification subscriptions. The subscription component 410 may implemented one or more APIs that enable users to subscribe to receive particular notification topics. In some embodiments, the one or more APIs may include one or more Create, Read, Update, and Delete (CRUD) APIs.

When a user/group of users subscribes to receive a notification topic, the subscription component 410 may associate, in the subscription storage, a user/group identifier, of the user/group of users, with a notification topic indicator corresponding to the notification topic. In some situations, the user/group of users may subscribe to receive a notification topic from one or more particular content publishers 135. In such situations, the subscription component 410 may associate, in the subscription storage, the user/group identifier with the notification topic indicator and each identifier of each of the one or more content publishers 135. The data, in the subscription storage, enables user/group identifier-based retrieval of requested notification subscriptions.

The delivery preference component 415 may manage all requested notification delivery preferences. The delivery preference component 415 may communicate with a requested notification delivery preference storage (not illustrated) containing all requested notification delivery preferences. The delivery preference component 415 may implemented one or more APIs that enable users to indicate preferences for receiving requested notifications (e.g., activation of a light indicator, display of a banner, a time when requested notifications can be or should not be output, etc.). In some embodiments, the one or more APIs may include one or more CRUD APIs.

In some instances, a user/group of users may indicate a delivery preference(s) with respect to a particular notification topic. In such instances, the delivery preference component 415 may associate, in the requested notification delivery preference storage, a user/group identifier, of the user/group of users, with a notification topic indicator, corresponding to the notification topic, and data representing the delivery preference(s). In some situations, the user/group of users may indicate a delivery preference(s) with respect to notification topic and one or more particular content publishers 135. In such situations, the delivery preference component 415 may associate, in the requested notification delivery preference storage, the user/group identifier with the notification topic indicator, each identifier of each of the one or more content publishers 135, and data representing the delivery preference(s). The data, in the requested notification delivery preference storage, enables user/group identifier-based retrieval of requested notification delivery preferences.

The VUI/GUI subscription and preference management component 420 may be configured to authenticate incoming user requests that originate from a companion application. A companion application is one that may be installed on a handheld device 110 (e.g., a smart phone or tablet) and that enables the handheld device 110 to communicate with the system 120 and the notification system 285. An example of a companion application is the Amazon Alexa application that may be installed on handheld devices.

The VUI/GUI subscription and preference management component 420 may include one or more APIs. In some embodiments, the one or more APIs may include one or more external proxy representation state transfer (REST) APIs that enable authentication of user requests. In some embodiments, the one or more APIs may include a backend proxy API.

The delivery management component 425 manages the runtime delivery of notifications (i.e., determines how notification content should be indicated to a user). The delivery management component 425 may include one or more APIs to manage runtime delivery of notifications. In some embodiments, the one or more APIs may include one or more CRUD APIs. For example, when the notification system 285 receives notification content for a user, the delivery management component 425 may be called to determine how the notification content should be indicated to the user. Such determination may be based on various considerations.

In some embodiments, the delivery management component 425 may determine notification content should be indicated only if the corresponding content publisher 135 has registered with the notification system 285 to provide notification contents to users. In some embodiments, the delivery management component 425 may determine notification content should be indicated only if the corresponding content publisher 135 has registered with the notification system 285 to provide notification content of the particular notification topic of the notification content. In some embodiments, the delivery management component 425 may determine notification content should be indicated only if the user has been notified of notification content with no more than a threshold frequency within a past duration of time. In some embodiments, the delivery management component 425 may determine notification content should be indicated only if a present time does not correspond to "quiet hours" (e.g., nighttime). In some embodiments, the delivery management component 425 may determine notification content should be indicated only if one or more devices of the intended recipient are not in a "do not disturb" mode (i.e., device identifiers of the one or more devices are not associated with do not disturb indicators/flags).

The delivery management component 425 may also determine preferences for how notification content should be indicated to the intended recipient. For example, the delivery management component 425 may determine a preference(s) of the content publisher 135 and/or the intended recipient. In some embodiments, the preference(s) of the content publisher 135 may be determined from the metadata associated with the received notification content. In some embodiments, the preference(s) of the intended recipient may be determined from a subscription(s) of the intended recipient. A preference(s) may indicate a channel for indicating the notification content (e.g., activation of a light indicator, display of a GUI element, vibration of a device, etc.) and/or when (e.g., time of day, day of week, etc.) the notification content may be indicated.

The delivery management component 425 may determine a channel(s) for indicating notification content. The delivery management component 425 may determine the channel(s) based on a preference(s) of a content publisher, a preference(s) of the intended recipient, and/or characteristics/components of one or more devices 110 of the intended recipient.

The content rendering component 430 is configured to generate read-time notification content. The content rendering component 430 may generate read-time notification content using one or more templates, using a serial peripheral interface (SPI) callback, or determining pre-configured notification content (e.g., requested content may be preconfigured). When generating the read-time notification content, the content rendering component 430 may validate that the generated notification content includes valid speech synthesis markup language (SSML).

The event bus 435 may allow content publishers 135 and other devices to publish events to the notification system 285. The event bus 435 may also allow other systems to subscribe to receive events published to the event bus 435 by components of the notification system 285.

The expiry tracking component 440 is configured to determine when notification content is expiring, and causing the notification content to be indicated and/or proactively output to an intended user. Details of the expiry tracking component 440 are described in further detail herein below.

Figure 5:
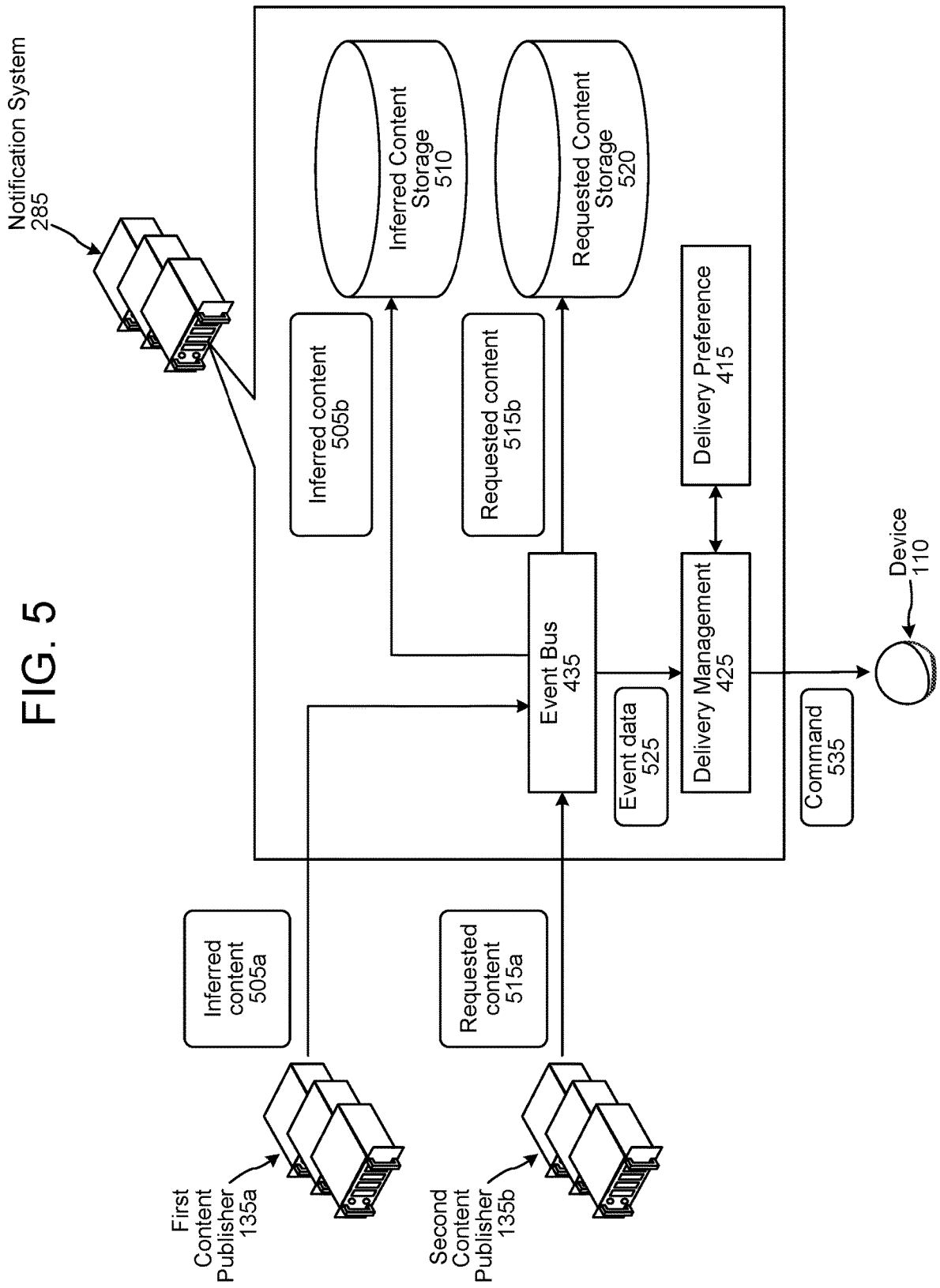
FIG. 5 is a conceptual diagram of components for receiving notification content and indicating same, according to embodiments of the present disclosure.

Referring now to FIG. 5, it is described how the notification system 285 may receive notification content and indicate same. A first content publisher 135*a* may send inferred content 505*a* to the event bus 435 of the notification system 285. In some embodiments, the inferred content 505*a* may be in a structured, tagged, non-natural language format. In other words, the inferred content 505*a* may not be in a format suitable for output to an intended user and/or group of users. For example, the inferred content 505*a* may include "NotificationTopic: Shopping Recommendation; Product: [product description]; Price: [product price]," representing a product having a specific price is available for purchase. For further example, the inferred content 505*a* may include "NotificationTopic: Feature/Functionality Recommendation; Feature/Functionality: [feature/functionality description]," representing a computing feature/functionality is available for use.

In some embodiments, the inferred content 505*a* may be in natural language. For example, the inferred content 505*a* may be "[product description] is available for purchase at [price], would you like me to order it for you?" For further example, the inferred content 505*a* may be "[feature/functionality description], would you like to enable?"

The inferred content 505*a* may be accompanied by (i.e., associated with) metadata. In some embodiments, the metadata may include a single user identifier corresponding to a single user to receive the inferred content 505*a*. For example, the inferred content 505*a* may recommend a user purchase a product based on the product being included in the user's electronic "wishlist" and/or based on a purchase history of the user. For further example, the inferred content 505*a* may recommend a feature/functionality of the system 120/device 110/skill 225 to a user that has used another feature/functionality of the system 120/device 110/skill 225 within a past amount of time (e.g., within a past day, week, month, etc.). In the foregoing examples, the metadata may include the user identifier of the particular user to receive the inferred content 505*a*.

In some embodiments, the metadata may include a group identifier corresponding to a group of users to receive the inferred content 505*a*. For example, the inferred content 505*a* may recommend a user group purchase a product based on the product being included in the user group's electronic "wishlist" and/or based on a purchase history of the user group. For further example, the inferred content 505*a* may recommend a feature/functionality of the system 120/device 110/skill 225 to a user group that has used another feature/functionality of the system 120/device 110/skill 225 within a past amount of time (e.g., within a past day, week, month, etc.). In the foregoing examples, the metadata may include the group identifier of the user group to receive the inferred content 505*a*.

In some embodiments, the metadata may include a user identifier(s) and/or group identifier(s) stored in the profile storage 270. In at least some embodiments, the metadata may include an encoded user identifier corresponding to a user identifier stored in the profile storage 270. In some embodiments, the metadata may include an encoded group identifier corresponding to a group identifier stored in the profile storage 270. In some embodiments, to maintain user privacy, the first content publisher 135*a* may not have access to a user identifier and/or group identifier stored in the profile storage 270. In these embodiments, the metadata may include an identifier that uniquely corresponds to a particular user identifier and/or group identifier stored in the profile storage 270.

In some embodiments, the metadata may include a parameter for identifying one or more users to receive the inferred content 505*a*. For example, the inferred content 505*a* may recommend a feature/functionality of the system 120/device 110/skill 225 to users that have used another feature/functionality of the system 120/device 110/skill 225 within a past amount of time (e.g., within a past day, week, month, etc.). In this example, the metadata may include the parameter of "used [feature/functionality description] within [past amount of time]."

In some embodiments, the metadata may include multiple user and/or group identifiers corresponding to multiple users and/or user groups to receive the inferred content 505*a*.

In some embodiments, the metadata may indicate a validity duration of the inferred content 505*a*. In other words, the metadata may indicate an amount of time (e.g., minutes, hours, days, etc.) that the inferred content 505a is valid for. In other embodiments, the first content publisher 135a may indicate a validity duration of a notification content topic when the first content publisher 135a registers with the notification system 285 to provide notification content to users thereof. In such embodiments, the metadata may include a notification content topic (e.g., product recommendation, feature/functionality recommendation, etc.), and the notification system 285 may determine the notification content topic in the metadata, determine the inferred content 505a and metadata was received from the first content publisher 135a, and, based on the foregoing, determine a validity duration of the inferred content 505a.

In some embodiments, the metadata may indicate a mechanism the first content publisher 135a recommends be used to output the inferred content 505a. For example, the metadata may indicate the inferred content 505a should be output as synthesized speech. For further example, the metadata may indicate the inferred content 505a should be output using a display. As another example, the metadata may indicate the inferred content 505a should be output both as synthesized speech and using a display. In a further example, the metadata may indicate the inferred content 505a may be output either as synthesized speech or using a display.

In some embodiments, the metadata may include a first content publisher identifier corresponding to the first content publisher 135a.

In some embodiments, the first content publisher 135a may send the inferred content 505a and associated metadata to the event bus 435 via an application programing interface (API).

The event bus 435 may communicate with an inferred content storage 510. The inferred content storage 510 may be implemented by the notification system 285. When the metadata, associated with the inferred content 505a, includes a user identifier, the inferred content storage 510 may store an association between inferred content 505b (corresponding to the inferred content 505a), the user identifier, and the metadata. When the metadata, associated with the inferred content 505a, includes a group identifier, the inferred content storage 510 may store an association between the inferred content 505b, the group identifier, and the metadata. Additionally or alternatively, when the metadata, associated with the inferred content 505a, includes a group identifier, the notification system 285 may determine one or more user identifiers associated with the group identifier, and the inferred content storage 510 may store an association between the inferred content 505b, the metadata, and each of the one or more user identifier associated with the group identifier. When the metadata, associated with the inferred content 505a, includes a parameter for identifying one of more users, the notification system 285 may determine one or more user identifiers and/or one or more group identifiers corresponding to the parameter (e.g., having a usage history, user demographic information, etc. corresponding to the parameter), and the inferred content storage 510 may store an association between the inferred content 505, the metadata, and each of the one or more user identifiers and/or group identifiers corresponding to the parameter.

In some situations, the inferred content storage 510 may store more than one inferred content associated with a single user or group identifier at a point in time. In some embodiments, the notification system 285 may be configured to determine a score (e.g., confidence score, probability score, etc.) representing inferred content should in fact be output to a user. The inferred content storage 510 may associate inferred content with its respective score such that the inferred contents associated with a single user or group identifier may effectively be ranked within the inferred content storage 510 according to priority of output.

In some embodiments, the inferred content 505b may be a copy of the inferred content 505a. For example, the inferred contents 505a/505b may both be a structured, non-natural language formatted inferred content.

In some embodiments, the notification system 285 may receive the inferred content 505a in a structured, non-natural language form, but the inferred content storage 510 may store the inferred content 505b in a natural language form. In some embodiments, the notification system 285 may use a template-based approach to generate the natural language formatted inferred content 505b. A template may include natural language with portions (e.g., variables) to be populated with information from the structured, non-natural language inferred content 505a. A template may be associated with a content publisher 135. A template may additionally or alternatively be associated with a notification topic. In some embodiments, the notification system 285 may perform one or more art-known/industry-known natural language generation techniques using the structured, non-natural language inferred content 505a to generate the corresponding natural language inferred content 505b.

As described herein, in some embodiments inferred content may not be output until a user receives requested content as well. In such embodiments, the storage of the inferred content 505b (and associated metadata) in the inferred content storage 510 may not, in and of itself, cause other processing of the notification system 285 to be commenced.

Sometime after receiving and storing the inferred content 505a/505b, a second content publisher 135b may send requested content 515a to the event bus 435. While FIG. 5 illustrates first and second content publishers 135a/135b, it will be appreciated that the same content publisher may send both the inferred content 505a and the requested content 515a to the event bus 435.

In some embodiments, the requested content 515a may be in a structured, tagged, non-natural language format. In other words, the requested content 515a may not be in a format suitable for output to an intended user and/or group of users. For example, the requested content 515a may include "NotificationTopic: Meeting; Participant: John; Time: 15 minutes," representing a meeting with John is starting in 15 minutes. For further example, the requested content 515a may include "NotificationTopic: Email; SenderName: Jane; Time: 2 minutes," representing an email was received from Jane 2 minutes ago. In another example, the requested content 515a may include "NotificationTopic: GameUpdate; SportsTeamName: Seahawks; Time: 30 minutes," representing a Seahawks game is starting in 30 minutes. For further example, the requested content 515a may include "NotificationTopic: Weather Update; Weather: Rain; Time: 45 minutes," representing it will start raining in about 45 minutes. In another example, the requested content 515a may include "NotificationTopic: Taxi Update; TaxiServiceName: Bob's; ArrivalTime: 3 minutes; Vehicle: Red sedan; LicensePlate: ABCD1234; PickupLocation: 123 First Street," representing a red sedan, having license plate ABCD1234, from Bob's taxi service will be arriving in about 3 minutes at 123 First Street. For further example, the requested content 515a may include "NotificationTopic: Delivery Update; Product: Dish soap; DeliveryTime: 45 minutes," representing ordered dish soap is expected to be delivered in about 45 minutes. In another example, the requested content 515*a* may include "NotificationTopic: Media Update; TelevisionShow: News; Time: 10 minutes," representing the news will begin being televised in 10 minutes.

In some embodiments, the requested content 515*a* may be in natural language. For example, the requested content 515*a* may be "meeting with John is starting in 15 minutes." For further example, the requested content 515*a* may be "you received an email from Jane 2 minutes ago." In another example, the requested content 515*a* may be "the Seahawks game is starting in 30 minutes." For further example, the requested content 515*a* may be "it will start raining in about 45 minutes." In another example, the requested content 515*a* may be "a red sedan, having license plate ABCD1234, from Bob's taxi service will be arriving in about 3 minutes at 123 First Street." For further example, the requested content 515*a* may be "your dish soap order is expected to be delivered in about 45 minutes." In another example, the requested content 515*a* may be "the news will begin in 10 minutes."

The requested content 515*a* may be accompanied by (i.e., associated with) metadata. In some embodiments, the metadata may include a single user identifier corresponding to a single user to receive the requested content 515*a*. In some embodiments, the metadata may include a group identifier corresponding to a group of users to receive the requested content 515*a*. In some embodiments, the metadata may include multiple user and/or group identifiers corresponding to multiple users and/or user groups to receive the requested content 515*a*.

In some embodiments, the metadata may include a user identifier(s) and/or group identifier(s) stored in the profile storage 270. In at least some embodiments, the metadata may include an encoded user identifier corresponding to a user identifier stored in the profile storage 270. In some embodiments, the metadata may include an encoded group identifier corresponding to a group identifier stored in the profile storage 270. In some embodiments, to maintain user privacy, the second content publisher 135*b* may not have access to a user identifier and/or group identifier stored in the profile storage 270. In these embodiments, the metadata may include an identifier that uniquely corresponds to a particular user identifier and/or group identifier stored in the profile storage 270.

In some embodiments, the metadata may indicate a validity duration of the requested content 515*a*. In other words, the metadata may indicate an amount of time (e.g., minutes, hours, days, etc.) that the requested content 515*a* is valid for. In other embodiments, the second content publisher 135*b* may indicate a validity duration of a notification content topic when the second content publisher 135*b* registers with the notification system 285 to provide notification content to users thereof. In such embodiments, the metadata may include a notification content topic (e.g., email notification, sporting event update, etc.), and the notification system 285 may determine the notification content topic in the metadata, determine the requested content 515*a* and metadata was received from the second content publisher 135*b*, and, based on the foregoing, determine a validity duration of the requested content 515*a*.

In some embodiments, the metadata may indicate a mechanism the second content publisher 135*b* recommends be used to notify the user(s) and/or user group(s) of the requested content 515*a*. For example, the metadata may indicate notification of the requested content 515*a* should be conducted by activating a light indicator (e.g., a light ring, light emitting diode (LED), etc.) in a particular manner (e.g., exhibit a particular color, blink in a particular manner, etc.); displaying a GUI element, such as a banner, card, or the like; vibrating in a particular manner (e.g., at a particular vibration strength, particular vibration pattern, etc.); and/or using some other notification mechanism.

In some embodiments, the metadata may indicate a mechanism the second content publisher 135*b* recommends be used to output the requested content 515*a*. For example, the metadata may indicate the requested content 515*a* should be output as synthesized speech. For further example, the metadata may indicate the requested content 515*a* should be output using a display. As another example, the metadata may indicate the requested content 515*a* should be output both as synthesized speech and using a display. In a further example, the metadata may indicate the requested content 515*a* may be output either as synthesized speech or using a display.

In some embodiments, the metadata may include a second content publisher identifier corresponding to the second content publisher 135*b*.

In some embodiments, the second content publisher 135*b* may send the requested content 515*a* and associated metadata to the event bus 435 via an API. In some embodiments, the notification system 285 may be configured with a first API for sending inferred content to the event bus 435, and a second API for sending requested content to the event bus 435. In some embodiments, the notification system 285 may be configured with a single API for sending notification content to the event bus 435. In such embodiments, notification content may be associated with metadata indicating whether the notification content is inferred or requested. Additionally or alternatively, in such embodiments, the metadata may include a notification topic, and the notification system 285 may determine whether associated notification content is inferred or requested based on the notification topic.

The event bus 435 may communicate with a requested content storage 520. The requested content storage 520 may be implemented by the notification system 285. When the metadata, associated with the requested content 515*a*, includes a user identifier, the requested content storage 520 may store an association between requested content 515*b* (corresponding to the requested content 515*a*), the user identifier, and the metadata. When the metadata, associated with the requested content 515*a*, includes more than one user identifier, the requested content storage 520 may store an association between the requested content 515*b*, the metadata, and each of the more than one user identifier. When the metadata, associated with the requested content 515*a*, includes a group identifier, the requested content storage 520 may store an association between the requested content 515*b*, the group identifier, and the metadata. Additionally or alternatively, when the metadata, associated with the requested content 515*a*, includes a group identifier, the notification system 285 may determine one or more user identifiers associated with the group identifier, and the requested content storage 520 may store an association between the requested content 515*b*, the metadata, and each of the one or more user identifiers associated with the group identifier.

In some situations, the requested content storage 520 may store more than one requested content associated with a single user or group identifier at a point in time. In some embodiments, the notification system 285 may be configured to determine a score (e.g., confidence score, probability score, etc.) representing requested content should in fact be output to a user. The requested content storage 520 may associate requested content with its respective score such that the requested contents associated with a single user or group identifier may effectively be ranked within the requested content storage 520 according to priority of output.

In some embodiments, the requested content 515*b* may be a copy of the requested content 515*a*. For example, the requested contents 515*a*/515*b* may both be a structured, non-natural language formatted requested content.

In some embodiments, the notification system 285 may receive the requested content 515*a* in a structured, non-natural language form, but the requested content storage 520 may store the requested content 515*b* in a natural language form. In some embodiments, the notification system 285 may use a template-based approach to generate the natural language formatted requested content 515*b*. A template may include natural language with portions (e.g., variables) to be populated with information from the structured, non-natural language requested content 515*a*. A template may be associated with a content publisher 135. A template may additionally or alternatively be associated with a notification topic. In some embodiments, the notification system 285 may perform one or more art-known/industry-known natural language generation techniques using the structured, non-natural language requested content 515 to generate the corresponding natural language requested content 515*b*.

In some embodiments, the subscription component 410 (of the notification system 285) may confirm the intended user and/or group or users subscribed to receive the requested content 515*a* prior to storing the requested content 515*b* in the requested content storage 520. For example, the subscription component 410 may determine the user identifier and/or group identifier associated with the requested content 515*a*, and determine (in a subscription storage) whether the user and/or group identifier is associated with an identifier of the second content publisher 135*b* (and optionally the notification topic represented in the metadata associated with the requested content 515*a*). If the subscription component 410 determines the user and/or group of users has not subscribed to receive the requested content 515*a* (e.g., the subscription storage is not storing an association between the user and/or group identifier and an identifier of the second content publisher 135*b*, and optionally the notification topic), the subscription component 410 may prevent the requested content 515*b* from being stored in the requested content storage 520. Conversely, if the subscription component 410 determines the user and/or group of users has subscribed to receive the requested content 515*a* (e.g., the subscription storage is storing an association between the user and/or group identifier and an identifier of the second content publisher 135*b*, and optionally the notification topic), the subscription component 410 may store the requested content 515*b* in the requested content storage 520.

As described above, the notification system 285 may be configured to store notification content in two separate storages (i.e., store inferred content in the inferred content storage 510 and requested content in the requested content storage 520). In some embodiments, the notification system 285 may store all notification content in a single notification content storage (not illustrated). In such embodiments, in addition to the data associations detailed above, each notification content in the single notification content storage may be associated with data indicating whether the notification content is inferred or requested.

It will be appreciated that the foregoing processing and storage with respect to the inferred content 505*b* and requested content 515*b* may be performed with respect to additional inferred content and/or requested content intended for a same user and/or group of users.

After receiving the requested content 515*a* from the second content publisher 135*b* (and optionally after storing the requested content 515*b* in the requested content storage 520), the event bus 435 may publish event data 525 representing the requested content 515*a* has been received (or the requested content 515*b* has been stored). The delivery management component 425 subscribe to receiving such event data 525. Upon receiving the event data 525, the delivery management component 425 may determine whether the user and/or group of users should be notified that the requested content 515*b* is available for output.

The user and/or group of users (and more particularly the user and/or group profile data of the user and/or group of users) may be associated with one or more devices 110 configured to notify the user and/or group of users using one or more techniques. For example, the user and/or group of users may be associated with one or more devices 110 configured to notify the user, that the requested content 515*b* is available for output, by activating a light indicator (e.g., a light ring, light emitting diode (LED), etc.) in a particular manner (e.g., exhibit a particular color, blink in a particular manner, etc.); displaying a GUI element, such as a banner, card, or the like; vibrating in a particular manner (e.g., at a particular vibration strength, particular vibration pattern, etc.); and/or use some other mechanism. The delivery management component 425 may determine which device(s) 110 and which notification mechanism(s) should be used to notify the user and/or group of users of that the requested content 515*b* is available for output.

The delivery management component 425 may determine how to notify the user(s) of the requested content 515 based on device characteristics. The event data 525 may include the user and/or group identifier associated with the requested content 515*b* in the requested content storage 520. The delivery management component 425 may query the profile storage 270 for device characteristic data associated with one or more device identifiers associated with the user and/or group identifier. A given device 110's device characteristic data may represent, for example, whether the device 110 has a light(s) capable of indicating the requested content 515*b* is available for output, whether the device 110 includes or is otherwise in communication with a display capable of indicating the requested content 515*b* is available for output, and/or whether the device 110 includes a haptic component capable of indicating the requested content 515*b* is available for output.

The delivery management component 425 may indicate the requested content 515*b* is available for output based on the device characteristic data. For example, if the delivery management component 425 receives first device characteristic data representing a first device 110*a* includes a light(s), the delivery management component 425 may send, to the first device 110*a*, a first command 535*a* to activate the light(s) in a manner that indicates the requested content 515*b* is available for output. In some situations, two or more devices of the user and/or group of users may be capable of indicating the requested content 515*b* is available for output using lights of the two or more devices. In such situations, the delivery management component 425 may send, to each of the two or more devices, a command to cause the respective device's light(s) to indicate the requested content 515*b* is available for output.

The delivery management component 425 may additionally or alternatively receive second device characteristic data representing a second device 110b includes or is otherwise in communication with a display. In response to receiving the second device characteristic data, the delivery management component 425 may send, to the second device 110b, a second command 535b to display text, an image, a popup graphical element (e.g., a banner) that indicates the requested content 515b is available for output. For example, the displayed text may correspond to "you have an unread notification." But the text may not include specifics of the requested content 515b. An example of the second command 535b may be a mobile push command.

In some situations, two or more devices of the user and/or group of users may be capable of indicating the requested content 515b is available for output by displaying content. In such situations, the delivery management component 25 may send, to each of the two or more devices, a command to cause the respective device to display content indicating the requested content 515b is available for output.

The delivery management component 425 may additionally or alternatively receive third device characteristic data representing a third device 110c includes a haptic component. In response to receiving the device characteristic data, the delivery management component 425 may send, to the third device 110c, a third command 535c to vibrate in a manner that indicates the requested content 515b is available for output.

The delivery management component 425 may determine how to indicate the requested content 515b is available for output based on a user and/or group preference(s) corresponding to the user and/or group identifier associated with the requested content 515b in the requested content storage 520. For example, the delivery management component 425 may query the delivery preference component 415 for one or more indication preferences associated with the user and/or group identifier. An indication preference may indicate whether requested content is to be indicated using a light indicator, displayed content, vibration, and/or some other mechanism. An indication preference may indicate requested content, corresponding to a particular notification topic, is to be indicated using a light indicator, displayed content, vibration, and/or some other mechanism.

The delivery management component 425 may additionally or alternatively determine how to indicate the requested content 515b is available for output based on a preference of the second content publisher 135b that provided the requested content 515a. For example, during offline operations, the second content publisher 135b may indicate requested content is to be indicated using a light indicator, displayed content, vibration, and/or some other mechanism. For further example, during offline operations, the second content publisher 135b may indicate requested content, corresponding to a particular notification topic, is to be indicated using a light indicator, displayed content, vibration, and/or some other mechanism. In another example, the second content publisher 135b may indicate, at runtime, how the requested content 515a is to be indicated. For example, the requested content 515a may be associated with metadata representing how the requested content 515a is to be indicated to the user and/or group of users. The delivery management component 425 may query the delivery preference component 415 for one or more indication preferences associated with the identifier of the second content publisher 135b, and optionally the notification topic associated with the requested content 515a.

In some situations, the delivery preference component 415 may determine and send, to the delivery management component 425, a user preference(s) and a content publisher preference(s) for indicating the requested content 515b is available for output. The delivery management component 425 may give priority to the user preference(s) in situations where the user preference(s) does not conform with the content publisher preference(s) (e.g., the user preference(s) indicates the requested content 515b is to be indicated using a light(s), but the content publisher preference(s) indicates the requested content 515b is to be indicated using displayed content).

In some situations, the delivery management component 425 may determine no device 110 of the user and/or group of users is capable of indicating the requested content 515b as preferred by either a user preference(s) or a content publisher preference(s). In such situations, the delivery management component 425 may cause the device(s) 110 of the user and/or group of users to indicate the requested content 515b according to characteristics of the device(s) 110.

In some situations, while the device(s) 110 is indicating the requested content 515b is available for output, the event bus 435 may receive additional requested content intended for the same user and/or group of users. Thus and in some embodiments, after receiving the event data 525, the delivery management component 425 may determine whether a device(s) 110 of the user and/or group of users is presently indicating the requested content 515b is available for output.

As part of the foregoing determination, the delivery management component 425 may determine a user and/or group identifier represented in the event data 525. If the event data 525 includes an encoded user and/or group identifier, the delivery management component 425 may perform one or more art-known/industry-known decoding techniques on the encoded user and/or group identifier to determine the corresponding user and/or group identifier. If the event data 525 includes a unique identifier as described previously, the delivery management component 425 may use a table (including unique identifiers associated with respective user and/or group identifiers) to determine the unique identifier is associated with a particular user and/or group identifier.

After receiving or determining the user and/or group identifier, the delivery management component 425 may determine one or more device identifiers (e.g., device serial numbers) associated with the user and/or group identifier. In other words, the delivery management component 425 determines one or more device identifiers corresponding to one or more devices 110 registered to a user and/or group of users corresponding to the user and/or group identifier.

Thereafter, the delivery management component 425 may determine whether at least one of the one or more device identifiers is associated with data (e.g., a flag or other indicator) representing a device(s) 110 is presently indicating requested content is available for output. If the delivery management component 425 determines a device(s) 110 is presently indicating requested content is available for output, the delivery management component 425 may cease processing with respect to the event data 525 (and not send an additional command(s) 535 to the device(s) 110). Conversely, if the delivery management component 425 determines no devices 110 of the user and/or group of users are presently indicating requested content is available for output, the delivery management component 425 may determine how the requested content 515b is to be indicated to the user and/or group of users (as described herein above).

Referring to FIG. 6, sometime while the at least one device 110 of the user and/or group of users is indicating the requested content 515*b* is available for output, a device 110 of the user and/or group of users may receive a user input to output notification content(s) of the user and/or group of users. For example, the device 110 may receive audio corresponding to a spoken natural language user input to output notification content(s). An example of such a spoken natural language user input may be "what are my notifications," "output my notifications," and the like. For further example, the device 110 may receive a textual (e.g., typed) natural language user input to output notification content(s). In another example, the device 110 may include or otherwise be associated with a camera that captures a sequence of images representing the user 5 performing a gesture (an example of a user input) to output notification content(s). In a further example, the device 110 may include a button or display a virtual button (or other graphical user interface (GUI) element capable of being interacted with by the user 5), and the device 110 may detect the user 5 interacting with the button or other GUI element (an example of a user input) to output notification content(s).

In some embodiments, the device 110 may send data, representing the user input, to the system 120 for processing. In some instances, the device 110 may be configured to communicate with (i.e., send data to and received data from) the system 120 via an application installed on the device 110 and associated with the system 120. Such an application may be referred to as a companion application. An example of such an application is the Amazon Alexa application that may be installed on a smart phone or tablet.

The device 110 and/or system 120 (depending on the components illustrated in FIGS. 2-3 being implemented) processes data representing the user input (e.g., audio data representing a spoken natural language user input, text data representing a text-based natural language user input, data representing a performed gesture, data representing a button interaction, etc.) to determine skill input data (e.g., NLU output data) representing the user input requests notification content(s) be output, and including a user and/or group identifier associated with the device 110 (that captured the user input) and/or user 5 (that provided the user input). In response, the device 110/system 120 may send the skill input data to a notification skill 225*a*.

The notification skill 225*a* processes the skill input data to determine the skill input data represents notification content(s) is to be output, and includes the user and/or group identifier. In response to such processing, the notification skill 225*a* generates request data 605 including the user and/or group identifier and requesting notification content(s) associated with the user and/or group identifier. The notification skill 225*a* sends the request data 605 to the content rendering component 430 of the notification system 285.

In response to receiving the request data 605, the content rendering component 430 queries the requested content storage 520 for notification content associated with the user and/or group identifier represented in the request data 605. In response, the content rendering component 430 receives at least the requested content 515*b*. Moreover, in response to receiving the request data 605, the content rendering component 430 queries the inferred content storage 510 for notification content associated with the user and/or group identifier represented in the request data 605. In response, the content rendering component 430 receives at least the inferred content 505*b*.

Since the inferred content 505*b* may not be output until after the user or group of users is notified of the requested content 515*b*, it will be appreciated that a duration of time may occur between when the notification system 285 stores the inferred content 505*b* in the inferred content storage 510 and when the notification skill 225*a* sends the request data 605 to the content rendering component 430. In some situations, the inferred content 505*b* may be outdated or otherwise need updating prior to being output. For example, if the inferred content 505*b* is a shopping recommendation that includes a number of available products, the inferred content 505*b* may need to be updated to reflect a number of available products at the time of output to the user and/or group of users.

In view of the foregoing, the content rendering component 430 may determine the inferred content 505*b* was received from the first content publisher 135*a* (e.g., based on an identifier of the first content publisher 135*a* being associated with the inferred content 505*b* in the inferred content storage 510). Thereafter, the content rendering component 430 may send an update notification content request to the first content publisher 135*a*. The update notification content request may include an identifier uniquely identifying the inferred content 505*b* to the first content publisher 135*a*. In some embodiments, this identifier may be represented in the metadata associated with the inferred content 505*a*/505*b*. In some embodiments, the content rendering component 430 may send the update notification content request via a serial peripheral interface (SPI). As such, if the content rendering component 430 receives multiple inferred contents from the inferred content storage 510, the content rendering component 430 may send a respective update notification content requeste to two or more different content publishers 135 via the SPI.

In response to receiving the update notification content request, the first content publisher 135*a* may determine the inferred content 505*b* as stored by the first content publisher 135*a*, and may generate updated inferred content 615 therefrom. In some embodiments, the updated inferred content 615 may be in a structured, non-natural language format. In some embodiments, the updated inferred content 615 may be in a natural language format. In some embodiments, the first content publisher 135*a* may perform art-known/industry-known natural language generation processing to generate the updated inferred content 615.

For example, if the inferred content 505*b* corresponds to "a deal just started for [product name]," the first content publisher 135*a* may determine (in response to receiving the update notification content request) that 85% of the product has been sold, and the updated inferred content 615 may be generated to correspond to "a deal for [product name] is 85% sold out" or "a deal for [product name] is almost sold out." As such, it will be appreciated that the first content publisher 135*a* may generate the updated inferred content 615 based on information that became available to the first content publisher 135*a* after the first content publisher 135*a* sent the inferred content 505*a* to the notification system 285.

In some embodiments, in response to receiving the update notification content request, the first content publisher 135*a* may determine additional inferred content that became available after sending the inferred content 505*a* to the notification system 285. In such embodiments, the first content publisher 135*a* may perform natural language generation (or other) processing to generate the updated inferred content 615 to correspond to the inferred content 505*b* and the additional inferred content. For example, if the inferred content 505*b* is a shopping recommendation for a first product, the additional inferred content may be a shopping recommendation for a second product that became on sale after the inferred content 505a was originally sent to the notification system 285.

In some embodiments, the content rendering component 430 may determine a rating associated with a content publisher 135 (or other value representing the content publisher 135 will generate the updated inferred content 615 without including profanity or other adult-only content), and may only send the update notification content request to the content publisher 135 if the rating (or other value) satisfies a condition (e.g., meets or exceeds a threshold rating/value). Such processing configures the content rendering component 430 to only send an update notification content requested to a content publisher 135 trusted by the content rendering component 430, as in some embodiments the content rendering component 430 may not be configured to check the updated inferred content 615 for profanity or other adult-only content. The rating or other value may be based at least in part on user feedback data received from users of the system 100 with respect to previous data generated by the content publisher 135.

In some embodiments, the first content publisher 135a may not generate the updated inferred content 615 in response to receiving the update notification content request (e.g., in situations wherein the first content publisher 135a is unaware of any updated or additional inferred content).

In some embodiments, rather than sending the inferred content 505a to the event bus 435, the first content publisher 135a may send, to the event bus 435, data indicating the first content publisher 135a wants inferred content to be output to the user or group of users. In such embodiments and in response to receiving the request data 605, the content rendering component 430 may query the first content publisher 135a for inferred content, and the first content publisher 135a may in turn send the updated inferred content 615 to the content rendering component 430.

The content rendering component 430 sends, to the notification skill 225a, notification content 625. In some embodiments, the notification content 625 may include at least the requested content 515b and the inferred content 505b (e.g., in the situation where the first content publisher 135a does not send the updated inferred content 615 to the content rendering component 430). In at least some embodiments, the notification content 625 may include at least the requested content 515b and the updated inferred content 615.

The notification system 285 may store a notifications history storage (not illustrated) that stores a record of notification contents output to one or more users of the system 100. Thus, in conjunction with or after sending the notification content 625 to the notification skill 225a, the content rendering component 430 may store a representation of the notification content 625 in the notifications history storage. The representation may include each notification content included in the notification content 625, the respective content publisher 135 for each notification content, and the user/group identifier.

In some embodiments, prior to sending the notification content 625 to the notification skill 225a, the content rendering component 430 may query the notifications history storage to determine whether the requested content 515b, and/or inferred content 505b or updated inferred content 615 (depending on whether the first content publisher 135a generated same), was previously output to the user and/or group of users. In other words, the content rendering component 430 may query the notifications history storage to determine whether the requested content 515b, and/or inferred content 505b or updated inferred content 615, is associated with the user and/or group identifier in the notification history storage. If such querying indicates that none of the requested content 515b, or inferred content 505b or updated inferred content 615, was previously output to the user and/or group of users, then the content rendering component 430 may include the requested content 515b, and inferred content 505b or updated inferred content 615, in the notification content 625 sent to the notification skill 225a. Conversely, if such querying indicates one of the notification contents was previously output to the user and/or group of users, then the content rendering component 430 may exclude that notification content from the notification content 625 sent to the notification skill 225a.

In some embodiments, the content rendering component 430 may only include the inferred content 505b, or updated inferred content 615, in the notification content 625 if the inferred content 505b, or updated inferred content 615, corresponds to a same notification topic (or domain) as the requested content 515b.

Additionally, in response to receiving the request data 605, the content rendering component 430 may query a user/group preference storage 610 (which may be stored by the notification system 285) for user/group preference data 635 associated with the user and/or group identifier, and may send the user/group preference data 635 to the notification skill 225a. The user/group preference data 635 may represent one or more user/group preferences for ordering the output of notification contents. For example, a user/group preference may represent a certain notification topic is to be output prior to any other notification topic. For further example, a user/group preference may represent a first notification topic is to be output prior to a second notification topic.

The user/group preference data 635 may represent one or more user/group preferences regarding output of notification content on specific device types. For example, a user/group preference may represent inferred content is to be output using a specific device type, using a specific mechanism (e.g., synthesized speech, displayed content, etc.), and/or at a specific time of day.

The system 120/device 110 may be configured to query a user as to whether the user liked or disliked output inferred content. The user response to such a query may be embodied in user feedback data stored in a user feedback storage 620 (which may be implemented by the notification system 285). In some embodiments, the system 120/device 110 may display (e.g., in a notification center portion of an application) the user's/group of users' previously output inferred content, and the user may provide feedback specific to one or more of the previously output inferred content. The foregoing is an example of explicit user feedback data. In some embodiments, the system 120/device 110 may generate implicit (negative) user feedback data based on a user interrupting the output of inferred content (e.g., by saying "stop", "cancel," etc.).

The content rendering component 430 may query the user feedback storage 620 for user feedback data 645 associated with the user and/or group profile identifier, and may send the user feedback data 645 to the notification skill 225a. The user feedback storage 620 may store, for a given instance of a previously-output inferred content, either positive user feedback data (representing the user liked the inferred content) or negative user feedback data (representing the user did not like the inferred content).

Whereas the content rendering component 430 may be configured to send all data, required to output notification content, to the notification skill 225*a*, the notification skill 225*a* may be configured to construct the output to the user. The notification skill 225*a* may generate an ordering (of the notification contents in the notification content) based on the user/group preference data 635, the user feedback data 645, and/or one or more default ordering rules (which may order notification contents based on notification type (e.g., inferred v. requested, shopping notification v. system feature/functional notification, sporting event score notification v. new email notification, etc.)). In some embodiments, the notification skill 225*a* may implement a rules engine that processes the user/group preference data 635, the user feedback data 645, and the default ordering rule(s) to determine the ordering. In some embodiments, the notification skill 225*a* may implement a heuristics-based algorithm (or other type of algorithm) that takes into consideration the user/group preference data 635, the user feedback data 645, and the default ordering rule(s) for determining the ordering. In at least some embodiments, the notification skill 225*a* may implement a machine learning model that processes the user/group preference data 635, the user feedback data 645, and the default ordering rule(s) to determine the ordering.

In some situations, the notification skill 225*a* may determine the inferred content 505*b*, or the updated inferred content 615, should not be output based on the user feedback data 645. For example, the notification skill 225*a* may determine the user feedback data 645 is negative user feedback data relating to a notification topic, and the notification skill 225*a* may determine the inferred content 505*b* or inferred content 615 corresponds to the notification topic. For further example, the notification skill 225*a* may determine the user feedback data 645 is negative user feedback data relating to the first content publisher 135*a*, and the notification skill 225*a* may determine the inferred content 505*b* or inferred content 615 was generated by the first content publisher 135*a*.

In some embodiments, the notification skill 225*a* may determine the inferred content 505*b*, or the updated inferred content 615, should not be output based on data represented in the historical output storage 140. For example, the notification skill 225*a* may query the historical output storage 140 as to whether the inferred content 505*b*, or the updated inferred content 615, has been output using the instant user identifier, instant group identifier, and/or a device identifier of a device associated with the instant user and/or group identifier. If the query indicates the historical output storage 140 includes data indicating the inferred content 505*b*, or the updated inferred content 615, has been output using the instant user identifier, instant group identifier, the notification skill 225*a* may determine the inferred content 505*b*, or the updated inferred content 615, should not be output. If the query indicates the historical output storage 140 includes data indicating the inferred content 505*b*, or the updated inferred content 615, has been output using the device identifier, the notification skill 225*a* may determine the inferred content 505*b*, or the updated inferred content 615, should not be output using that particular device (but that the inferred content 505*b*, or updated inferred content 615, may still be output using a different device associated with the instant user and/or group identifier).

In some embodiments, the query may indicate the historical output storage includes data indicating the inferred content 505*b*, or the updated inferred content 615, has been output using the user identifier, group identifier, and/or device identifier, but the notification skill 225*a* may nonetheless determine the inferred content 505*b*, or the updated inferred content 615, can be output based on when the inferred content 505*b*, or the updated inferred content 615, was previously output. For example, in response to the query the notification skill 225*a* may receive a timestamp of when the inferred content 505*b*, or the updated inferred content 615, was previously output using the user identifier, group identifier, and/or device identifier. If the notification skill 225*a* determines the timestamp corresponds to a time at least a threshold duration in the past (e.g., at least a week ago, at least a month ago, etc.), then the notification skill 225*a* may determine the inferred content 505*b*, or the updated inferred content 615, may be output again.

The notification skill 225*a* may determine how the notification contents should be output. For example, the notification skill 225*a* may determine the notification contents should be output as synthesized speech. For further example, the notification skill 225*a* may determine the notification contents should be displayed. In another example, the notification skill 225*a* may determine the notifications contents should be both output as synthesized speech and displayed.

The notification skill 225*a* may determine the inferred content 505*b*, or the updated inferred content 615, should not be output based on how the notification contents are to be output. For example, the notification skill 225*a* may determine the user/group preference data 635 indicates a notification topic is to be output using a specific mechanism (e.g., synthesized speech and/or displayed), may determine the inferred content 505*b* or updated inferred content 615 corresponds to the notification topic, determine the notification contents are to be output using a mechanism other than the user/group preferred mechanism, and based thereon determine the inferred content 505*b* or inferred content 615 should not be output.

The notification skill 225*a* may determine the inferred content 505*b*, or the updated inferred content 615, should not be output based a time of day. For example, the notification skill 225*a* may determine the user/group preference data 635 indicates inferred content is to be output during a specific time of day, may determine a present time does not correspond to the time of day, and based thereon determine the inferred content 505*b* or inferred content 615 should not be output. For further example, the notification skill 225*a* may determine the user/group preference data 635 indicates inferred content is not to be output during a specific time of day, may determine a present time corresponds to the time of day, and based thereon determine the inferred content 505*b* or inferred content 615 should not be output.

In some embodiments, the notification skill 225*a* may determine notification content to be output was received by the notification skill 225*a* in a structured, non-natural language format. In some embodiments, the notification skill 225*a* may use an art-known/industry-known template-based approach to generate natural language notification content corresponding to the structured, non-natural language notification content. In some embodiments, the notification skill 225*a* may use an art-known/industry-known natural language generation processing-based approach to generate natural language notification content corresponding to the structured, non-natural language notification content.

In embodiments where the notification skill 225*a* determines the notification contents are to be output as audio, the notification skill 225*a* may send a respective natural language representation of each notification content to be output to the TTS component 280, and the TTS component 280 may perform TTS processing on each instance of natural language notification content to generate different instances of audio data including synthesized speech corresponding to respective natural language notification content. The notification skill 225*a* may then cause the different audio data (corresponding to the different natural language synthesized speech of the different notification contents) to be sent to the device 110 (in situations wherein the notification skill 225*a* is not implemented by the device 110) and output by the device 110 in the order determined by the notification skill 225*a*. This may include the notification skill 225*a* causing order data to be sent to the device 110, with the order data representing the order determined by the notification skill 225*a*.

In some embodiments, the notification skill 225*a* may generate ordered natural language notification contents corresponding to the different instances of the natural language notification content in the order determined by the notification skill 225*a*. In such embodiments, the notification skill 225*a* may send the ordered natural language notification contents to the TTS component 280, and the TTS component 280 may perform TTS processing on the ordered natural language notification contents to generate a single instance of audio data including synthesized speech corresponding to the ordered natural language notification content. The notification skill 225*a* may then cause the audio data to output by the device 110.

Additionally or alternatively, the notification skill 225*a* may determine the natural language notification contents are to be displayed as natural language text. In such embodiments, the notification skill 225*a* may cause different instances of natural language text data (each corresponding to a different instance of natural language notification content) to be displayed by the device 110 (using a display of or otherwise associated with the device 110) in the order determined by the notification skill 225*a*. This may include the notification skill 225*a* causing order data to be sent to the device 110, with the order data representing the order determined by the notification skill 225*a*. In some embodiments, the notification skill 225*a* may send a single instance of natural language text data (corresponding to the ordered natural language notification contents) to be sent to the device 110 for output. In some embodiments, the device 110 may display natural language text (corresponding to different notification contents) in a list format.

In some embodiments, the notification skill 225*a* may cause one or more devices, associated with the same user and/or group profile data as the device 110 that captured the user input requesting notification content be output, to output the foregoing synthesized speech and/or display the foregoing natural language text.

As described above, a user and/or group of users' inferred content may be output after the user and/or group of users also receive requested content. In some instances, a user and/or group of users may not receive requested content prior to a validity of the inferred content expiring. For example, metadata, associated with the inferred content, may indicate the inferred content is valid for one hour, and the user and/or group of users may not receive requested content within one hour of the event bus 435 receiving the inferred content.

In some embodiments, when inferred content is about to expire, the notification system 285, and more particularly the expiry tracking component 440 thereof, may be configured to proactively notify the user and/or group of users of the expiring inferred content. Referring to FIG. 7, the expiry tracking component 440 queries the inferred content storage 510 for inferred content expiring within the threshold amount of time. In response, the expiry tracking component 440 receives at least the inferred content 505*b*. In some embodiments, the expiration time of inferred content may be an expiration time represented in a content publisher preference stored in a content publisher preference storage. For example, a content publisher preference may represent inferred content (e.g., corresponding to a particular notification topic) is to be output at 10:00 am and the present time may be 9:58 am.

The expiry tracking component 440 sends the user and/or group identifier 705, associated with the inferred content 505*b*, to the delivery management component 425. The delivery management component 425 in turn determine whether and how to indicate, to the user and/or group of users corresponding to the user and/or group identifier 705, that the inferred content 505*b* is available for output. To determine such, the delivery management component 425 may process as described herein above with respect to FIG. 5. In the event the delivery management component 425 determines the inferred content 505*b* is to be indicated to the user and/or group of users, the delivery management component 425 may send a command 715 to a device(s) 110 of the user and/or group of users. Such command 715 may be structured similarly to the command 535 described above with respect to FIG. 5.

After or while the inferred content 505*b* is indicated to the user and/or group of users as being available for output, the device 110 may receive a user input indicating the inferred content 505*b* is to be output. In response to such user input, the notification system 285 may process, as described herein above with respect to FIG. 6, to determine whether updated inferred content is to be output. Thereafter, the notification system 285 may cause the inferred content or updated inferred content to be output (e.g., as synthesized speech and/or displayed content).

In some embodiments, inferred and requested contents may be permitted to be stored in the inferred and requested content storages 510/520, respectively, even after the inferred and requested contents have been output to the user and/or group of users. In some embodiments, the expiry tracking component 440 may be configured to cause notification content to be deleted from the requested content storage 520 and the inferred content storage 510 upon the notification content expiring.

In some embodiments, the system notification system 285 may be configured to notify a user and/or group of users of inferred content after the inferred content has been stored for a threshold duration of time. The notification system 285 may execute the components described herein when determining how and whether the inferred content should in fact be indicated and output to the user and/or group of users.

Figure 8:
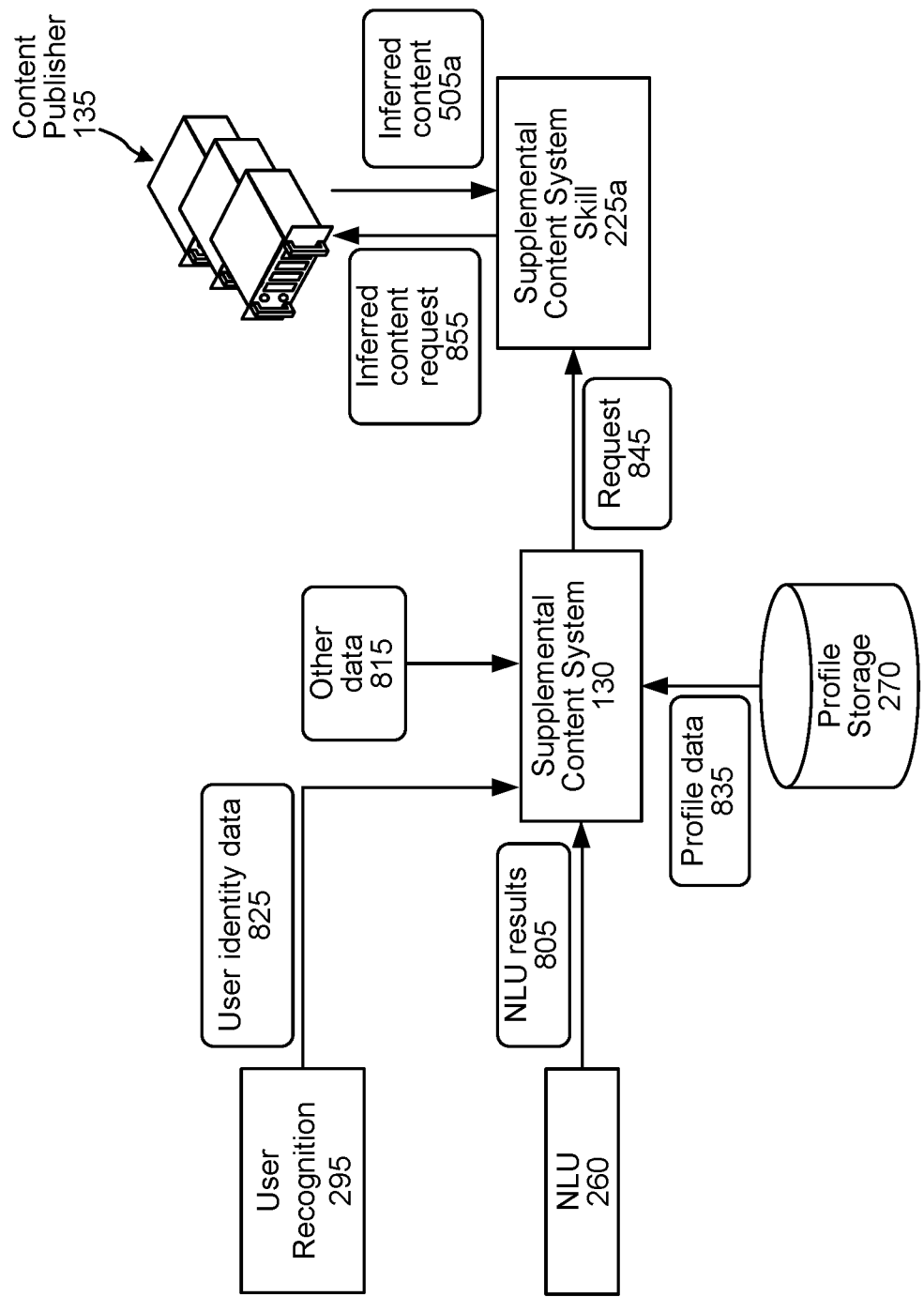
FIG. 8 is a conceptual diagram of how a supplemental content system may process, according to embodiments of the present disclosure.

FIG. 8 illustrates how the supplemental content system 130 may determine inferred content associated with but not directly responsive to a command as well as determine whether the inferred content should be output to a user. Each time the NLU component 260 outputs NLU results data 805, the NLU results data 805 may be input to the supplemental content system 130. The supplemental content system 130 determines whether inferred content associated with but not directly responsive to the command should be output.

The supplemental content system 130 may base its determinations at least in part on non-user specific data, such as skill-provided data, system generated intent pairs, etc.

The supplemental content system 130 may determine whether inferred content should be output based on data accompanying output data provided to the system 120 by a skill 225. Such data may be represented as other data 815. In addition to providing the system 120 with output data responsive to the command, the skill 225 may provide the system 120 with presentation framework data. The presentation framework data may include information indicating the types of content (e.g., audio, image, video, etc.) represented in the output data as well as one or more devices associated with the user 5 that should be used to output the different types of output data. The presentation framework data may, in some instances, also include information indicating the system 120 should determine inferred content associated with the output data, but which is not directly responsive to the command. When the presentation framework data includes such information, the supplemental content system 130 may determine inferred content may be output.

The supplemental content system 130 may also determine whether inferred content should be output based on data provided to the system 120 by a skill 225, with the data not accompanying output data. Such data is represented as other data 815. A skill 225 may provide the system 120 with data indicating that any time the NLU results data 805 indicates a particular intent, the supplemental content system 130 should solicit the skill 225 as to whether the skill 225 has inferred content that may be output. For example, a concert ticket skill may provide the system 120 with data indicating that anytime the NLU results data 805 indicates a <PlayMusic> intent, the supplemental content system 130 should solicit the concert ticket skill as to whether the concert ticket skill has access to information indicating a concert put on by a resolved artist entity represented in the NLU results data 805. For further example, an electronic calendar skill may provide the system 120 with data indicating that anytime the NLU results data 805 indicates an <OutputTime> intent, the supplemental content system 130 should solicit the electronic calendar skill as to whether the electronic calendar skill has calendar entries associated with an electronic calendar associated with the device 110 and/or user 5. Yet further, for example, a traffic report skill may provide the system 120 with data indicating that anytime the NLU results data 805 indicates a <BookRide> intent, the supplemental content system 130 should solicit the traffic report skill to provide current traffic report information.

The supplemental content system 130 may also determine whether inferred content should be output based on the intent represented in the NLU results data 805. The system 120 may store intent pair data (illustrated as other data 815) corresponding to pairs of intents. Each pair of intents may be associated with a respective score representing a likelihood that a second intent of the pair will be invoked by a user within a time threshold subsequent to content responsive to the first intent being output. The scores of various intent pairs may be normalized. The intent pair data may be untailored with respect to any given user of the system 120. For example, the intent pair data may include the following intent pairs with corresponding scores:

[0.345]<GetWeather>; <GetTraffic>
[0.217]<OrderPizza>; <PlayMovie>
[0.121]<PlayMusic>; <SetVolume>

The intent pair data may be configured based solely upon the natures of the intents. For example, a pair of intents may include a <PlayMusic> intent and a <ChangeVolume> intent. The pair of intents may be associated with a score representing a likelihood that a user may input a first command corresponding to the <PlayMusic> intent immediately prior to the user inputting a second command corresponding to the <ChangeVolume> intent based solely on the <PlayMusic> intent and the <ChangeVolume> intent both relating to output of audio from the system 120. For further example, a pair of intents may include a <BookPlaneTicket> intent and a <GetWeather> intent. This pair of intents may be associated with a score indicating a likelihood that users who by plane tickets often ask about the weather for their destination.

Intents may also be paired based on system usage history associated with various different users. Pairing of the intents may be skill agnostic. Thus, both the first intent and the second intent of a pair of intents may be associated with a single skill, or the first intent of the pair may be associated with a first skill while the second intent of the pair may be associated with a second skill. For example, a pair of intents may include a <PlayMusic> intent and a <ChangeVolume> intent, where both the <PlayMucic> intent and the <Change Volume> intent correspond to a music skill. For further example, a pair of intents may include a <BookPlaneTicket> intent and a <GetWeather> intent, where the <BookPlaneTicket> intent corresponds to a booking skill and the <GetWeather> intent corresponds to a weather skill. Pairing of the intents may also be agnostic with respect to the 1P or 3P nature of the skills associated with the intents. That is, both of the intents of a pair may be associated with one or more 1P skills implemented by the system 120/device 110, both of the intents of a pair may be associated with one or more 3P skills in communication with the system 120/device 110, or a first intent of a pair may be associated with a 1P skill while the second intent of the pair is associated with a 3P skill. For example, a pair of intents may include a <PlayMusic> intent and a <ChangeVolume> intent, where both the <PlayMusic> intent and the <Change Volume> intent are executed by a 1P skill. For further example, a pair of intents may include a <PlayMusic> intent and a <ChangeVolume> intent, where both the <PlayMusic> intent and the <Change Volume> intent are executed by a 3P music skill. For further example, a pair of intents may include a <BookPlaneTicket> intent and a <PlayMusic> intent, where the <BookPlaneTicket> intent is executed by a 3P skill and the <PlayMusic> intent is executed by a 1P skill.

The intent pair data may alternatively be user-specific. For example, if a user routinely invokes a <ChangeVolume> intent subsequent to a <PlayMusic> intent, the system 120 may increase the score associated with a pair of intents corresponding to these intents. Conversely, if the user rarely invokes the <ChangeVolume> intent subsequent to the <PlayMusic> intent, the system 120 may decrease the score associated with a pair of intents correspond to these intents.

The supplemental content system 130 may also base its determinations at least in part on presently input command originating user-specific data. Each user may have a different tolerance regarding how many times inferred content is output in a given period of time, what kinds of inferred content are output, as well as how inferred content is presented.

The supplemental content system 130 may receive user identity data 825 from the user recognition component 295. The user identity data 825 may indicate the presently input command originating user 5. The supplemental content system 130 may then receive profile data 835 from the user profile storage 270, with the profile data 835 being specific to the command originating user 5.

The profile data 835 may indicate a maximum number of times the user 5 has indicated the supplemental content system 130 should output inferred content in a specific period of time (e.g., twice/hour, ten (10) times/day, etc.). The maximum number of times may be irrespective to any specific skill, resolved entity, intent, or the like. For example, the profile data 835 may indicate the supplemental content system 130 should output inferred content a maximum of ten (10) times a day. If the supplemental content system 130 determines inferred content has been output to the user 5 less than ten (10) times prior to input of the present command, the supplemental content system 130 may generate request data 845 indicating inferred content should be output with a response to the present command. If the supplemental content system 130 determines inferred content has already been output to the user 5 ten (10) times prior to input of the present command, the supplemental content system 130 may not generate request data 845, thereby ending processing with respect to the output of inferred content and thereby resulting in inferred content not being output by the supplemental content system 130 with respect to the instant user input.

The profile data 835 may also indicate a user preference regarding how often (e.g., a frequency) inferred content of a specific type may be output in a specific amount of time. Alternatively, the profile data 835 may indicate a user preference regarding how often inferred content may be output in a specific amount of time with respect to a NLU intent. Content types include, but are not limited to, songs, news information, videos, concert ticket offers, shopping discounts, and newly available Alexa skills. For example, a first user preference of a first user may indicate inferred content corresponding to songs may be output ten (10) times a day whereas a second user preference of a second user may indicate inferred content corresponding to songs may be output two (2) times a week. For further example, a first user preference of a first user may indicate inferred content may be output with respect to ten (10) input commands corresponding to requests to play music in a single day whereas a second user preference of a second user may indicate inferred content may be output with respect to two (2) input commands corresponding to requests to play music in a single a week.

The profile data 835 may also indicate a user preference regarding the times at which the user 5 permits the supplemental content system 130 to output inferred content. For example, the user preference may indicate the supplemental content system 130 is permitted to output a first amount of inferred content over the duration of a morning and permitted to output a second amount of inferred content over the duration of an evening. The supplemental content system 130 may determine a time corresponding to the presently input command based on time information represented in the other data 815. If the supplemental content system 130 determines output inferred content has been output to the user 5 less times than that permitted (as indicated by the user preference) for the time corresponding to the present command, the supplemental content system 130 may generate request data 845. If the supplemental content system 130 determines the system has already output inferred content a number of permitted times (as indicated by the user preference) for the time corresponding to the present command, the supplemental content system 130 may not generate request data 845.

The profile data 835 may also indicate a user preference regarding the types of input commands with respect to which the user 5 permits, as well as does not permit, the supplemental content system 130 to output inferred content. For example, the user preference may indicate the supplemental content system 130 may output inferred content when the input command corresponds to a request to play music. For further example, the user preference may indicate the system may not output inferred content when the input command corresponds to a request to purchase a product using a shopping skill. If the supplemental content system 130 determines the current intent corresponds to one with respect to which the supplemental content system 130 is permitted (as indicated by the user preference) to output inferred content, the supplemental content system 130 may generate request data 845. If the supplemental content system 130 determines the current intent corresponds to one with respect to which the supplemental content system 130 is not permitted (as indicated by the user preference) to output inferred content, the supplemental content system 130 may not generate request data 845.

The profile data 835 may also indicate various characteristics of the user 5. The profile data 835 may indicate an age of the user 5, as users of different ages may be susceptible to receiving different amounts and/or kinds of inferred content. The profile data 835 may also indicate a culture of the user 5, as users of different cultures may be susceptible to receiving different amounts and/or kinds of inferred content. The profile data 835 may also indicate a geographic region, country, or other geographic location corresponding to the user's residence, as users residing in different geographic locations may be susceptible to receiving different amounts and/or kinds of inferred content. If the supplemental content system 130 determines the characteristics of the user 5 indicate inferred content should be output, the supplemental content system 130 may generate request data 845. If the supplemental content system 130 determines the characteristics of the user 5 indicate inferred content should not be output, the supplemental content system 130 may not generate request data 845.

The profile data 835 may also indicate a user preference regarding resolved entities with respect to which inferred content should be output. For example, the user preference may indicate the supplemental content system 130 should output inferred content any time the NLU results data 805 indicates a resolved entity corresponding to a particular sports team. For further example, the user preference may indicate the supplemental content system 130 should not output inferred content any time the NLU results data 805 indicates a resolved entity corresponding to a celebrity. If the supplemental content system 130 determines at least one resolved entity represented in the NLU results data 805 corresponds to an entity with respect to which the user preference indicates inferred content should be output, the supplemental content system 130 may generate request data 845. If the supplemental content system 130 determines at least one resolved entity represented in the NLU results data 805 corresponds to an entity with respect to which the user preference indicates inferred content should not be output, the supplemental content system 130 may not generate request data 845.

The other data 815 may indicate a region, country, or other geographic location of the device 110, as users interacting with devices 110 located in different geographic locations may be susceptible to receiving different amounts and/or kinds of inferred content. If the supplemental content system 130 determines the geographic location of the device 110 indicates inferred content should be output, the supplemental content system 130 may generate request data 845. If the supplemental content system 130 determines the geographic location of the device 110 indicates inferred content should not be output, the supplemental content system 130 may not generate request data 845.

The other data 815 may also include information representing the user's system usage history. The user's system usage history may represent data corresponding to instances of previous user inputs, ASR results, NLU results, as well as other processing results data. The supplemental content system 130 may determine one or more trends in the user's system usage history. For example, the supplemental content system 130 may determine the user 5 routinely inputs a command to output weather information for a location immediately following the input of a command to book a flight to the location. The supplemental content system 130 may also determine whether a current context (e.g., the current ASR results, current NLU results, etc.) corresponds to any of the determined trends. If the supplemental content system 130 determines the current context corresponds to at least one trend, the supplemental content system 130 may generate request data 845.

The other data 815 may also include data representing previously provided user feedback indicating the appropriateness of previously output inferred content. The other data 815 may also include social media data associated with the user, system usage history associated with the user, a history of music listened to by the user, a history of books purchased by the user, a general purchasing history of the user, a system browsing history of the user, a travel history of the user, information from the user's electronic calendar, etc.

The supplemental content system 130 may run one or more machine learning models to perform the determinations described above. The model(s) run by the supplemental content system 130 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the supplemental content system 130, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The model(s) run by the supplemental content system 130 may include skill specific rules. Thus, if the NLU results data 805 is associated with a specific skill, the model(s) may execute skill specific rules that are only associated with the specific skill. For example, the model(s) may include music skill specific rules that indicate inferred content should never by output when the music skill is represented in NLU results data 805 since the output of the music skill is long form music content. The portions of the model(s) specific to one or more skills may be considered static because they may remain constant overtime.

The model(s) run by the supplemental content system 130 may also be personalized to the user 5 at runtime. That is, the model(s) may be trained to consider a variety of information and, at runtime, the supplemental content system 130 may run the model(s) with respect to a variety of information specific to the user 5.

A user may provide the system with feedback regarding the appropriateness of output inferred content. Such feedback may be positive or negative. Moreover, a user may provide feedback to the system by speaking the feedback to the device 110, by interacting with a touchscreen of the device 110, by performing a gesture (e.g., thumbs up, thumbs down, etc.) that is captured by a camera of the device 110, etc. The system may train or retrain the model(s) using the feedback provided by the user so the supplemental content system 130 does not determine inferred content should be output if the current context corresponds to a previous instance where the user provided feedback indicating the inferred content was not applicable to the user or otherwise inappropriate/unnecessary from the user's perspective.

The supplemental content system 130 may compile all applicable other data 815 and user preferences indicated in the profile data 835 into a multi-dimensional feature vector. The supplemental content system 130 may impose a feature vector dimension threshold to determine whether to run the machine learned model(s) or to use system default rules with respect to when inferred content should be output. It will be appreciated that the more user-specific dimensions a feature vector has, the more user specific the output of the model(s) may be. It will also be appreciated that running a model(s) may be operationally intensive. Thus, the feature vector dimension threshold may be configured at a value representing a diminishing return of user-specific model(s) output. That is, if the multi-dimensional feature vector includes a number of dimensions not satisfying (e.g., falling below) the feature vector dimension threshold, the veracity of a user-specific model(s) output based on the multi-dimensional feature vector does not outweigh the operational intensity of running the model(s).

The system default rules for determining when inferred content should be output may be configured with respect to a theoretical user. For example, the system default rules may be based on the culture of a theoretical user, the geographic location (e.g., country, region, etc.) of a theoretical user, the maximum number of times a theoretical user would permit the supplemental content system 130 to output inferred content in a specific period of time, etc.

If the supplemental content system 130 generates request data 845 indicating inferred content should be output, the supplemental content system 130 sends the request data 845 to a supplemental content system skill 225a configured to determine inferred content associated with but not directly responsive to the current command. The request data 845 may include at least a portion of the NLU results data 805, and optionally at least a portion of the profile data 835 and/or at least a portion of the other data 815.

The request data 845 may indicate a specific skill that should be solicited for inferred content. As described above, a skill may provide the system 120 with data indicating that any time NLU results data indicates a particular intent, the supplemental content system 130 should solicit the skill as to whether the skill has inferred content that may be output.

When the supplemental content system 130 determines the NLU results data 805 indicates the particular intent, the request data 845 may include an indication that the supplemental content system skill 225a should solicit the specific skill for inferred content associated with one or more resolved entities represented in the NLU results data 805.

The supplemental content system skill 225a may determine a skill 290b from which to receive inferred content from based on the NLU results data 805. For example, the supplemental content system skill 225a may determine the NLU results data 805 includes a <PlayMusic> intent and a resolved artist of "Adele." Based thereon, the supplemental content system skill 225a may determine a concert booking skill from which to receive inferred content from.

The supplemental content system skill 225a (or the orchestrator component 230) may send, to the content publisher 135, an inferred content request 612 indicating at least a portion of the resolved entities represented in the NLU results data 805 that the content publisher 135 may need to determine inferred content. The system 120 may determine output data responsive to the user input prior to determining the content publisher 135 from which to receive inferred content. Alternatively, the system 120 may determine the content publisher 135 from which to receive inferred content after determining the NLU results data 805 but prior to determining the output data.

The content publisher 135 provides the supplemental content system skill 225a with inferred content 505a associated with but not directly responsive to the user input. The supplemental content system skill 225a then causes the device 110 to output the inferred. The inferred content may be output as synthesized speech, displayed text, etc.

In some instances, the content publisher 135 may be unable to determine inferred content. The content publisher 135 may provide the supplemental content system skill 225a with an indication of such, in which case the supplemental content system skill 225a may indicate same to the orchestrator component 230. In response, the orchestrator component 230 may simply cause the device 110 to output content directly responsive to the user input to the user 5.

The request data 845 may indicate a modality that inferred content should be output in. The modality the inferred content should be output in may be represented in the profile data 835 input to the supplemental content system 130. For example, the profile data 835 may indicate a user preference indicating that the user 5 prefers the system output inferred visual content over inferred audio content. In such a case, the inferred content request 855 may include a request for image data or video data if such can be obtained or generated by the content publisher 135.

The supplemental content system 130 may determine whether inferred content should be output while content responsive to a user input is output by the system. The device 110 may receive a command to cease output of the content responsive to the user input while the content is being output. For example, while a song is being output, a user may say "Alexa, cancel." The device 110 sends input data representing the user's cease output command to the system 120.

The system 120 processes the input data (e.g., by performing ASR and/or NLU) to determine an intent to cease output of the content. The supplemental content system 130 then determines inferred content should not be output based on the intent to cease output of the original content.

The device 110 may alternatively receive a command to decrease output of inferred content while content responsive to a user input is being output. For example, while plane ticket booking information is being output, a user may say "Alexa, only output inferred content 3 times a week."

The system 120 processes the input data to determine an intent to decrease or otherwise alter a frequency at which inferred content should be output. The supplemental content system 130 then determines a frequency at which inferred content was output prior to receiving the current command. If the frequency at which inferred content was output is equal to or greater than the decreased or otherwise altered frequency, the supplemental content system 130 determines to not output inferred content. If the frequency at which inferred content was output is less than the decreased or otherwise altered frequency, the supplemental content system 130 may determine to output inferred content using the teachings disclosed herein.

Figure 9:
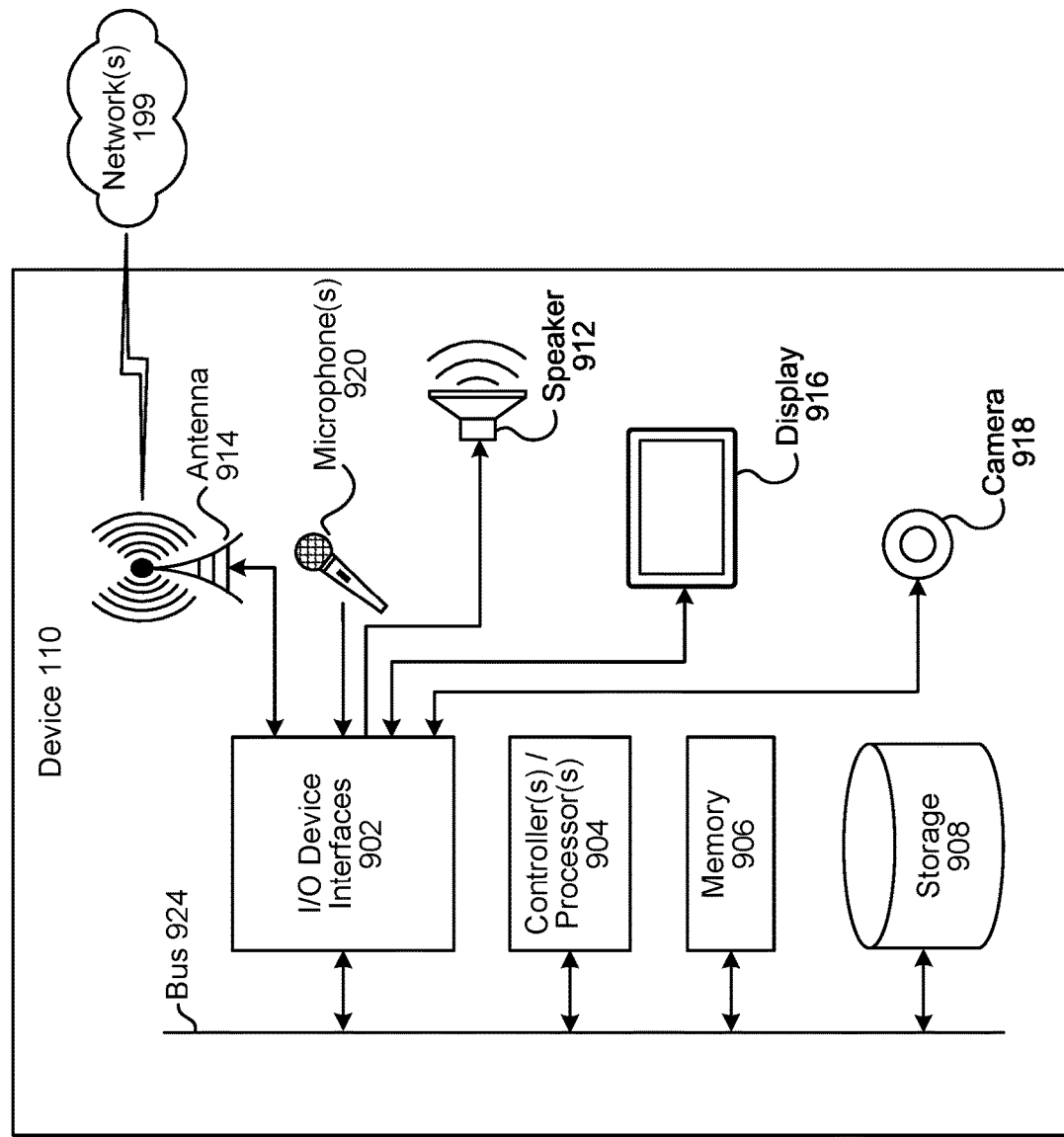
FIG. 9 is a block diagram conceptually illustrating example components of a device, according to embodiments of the present disclosure.
Figure 10:
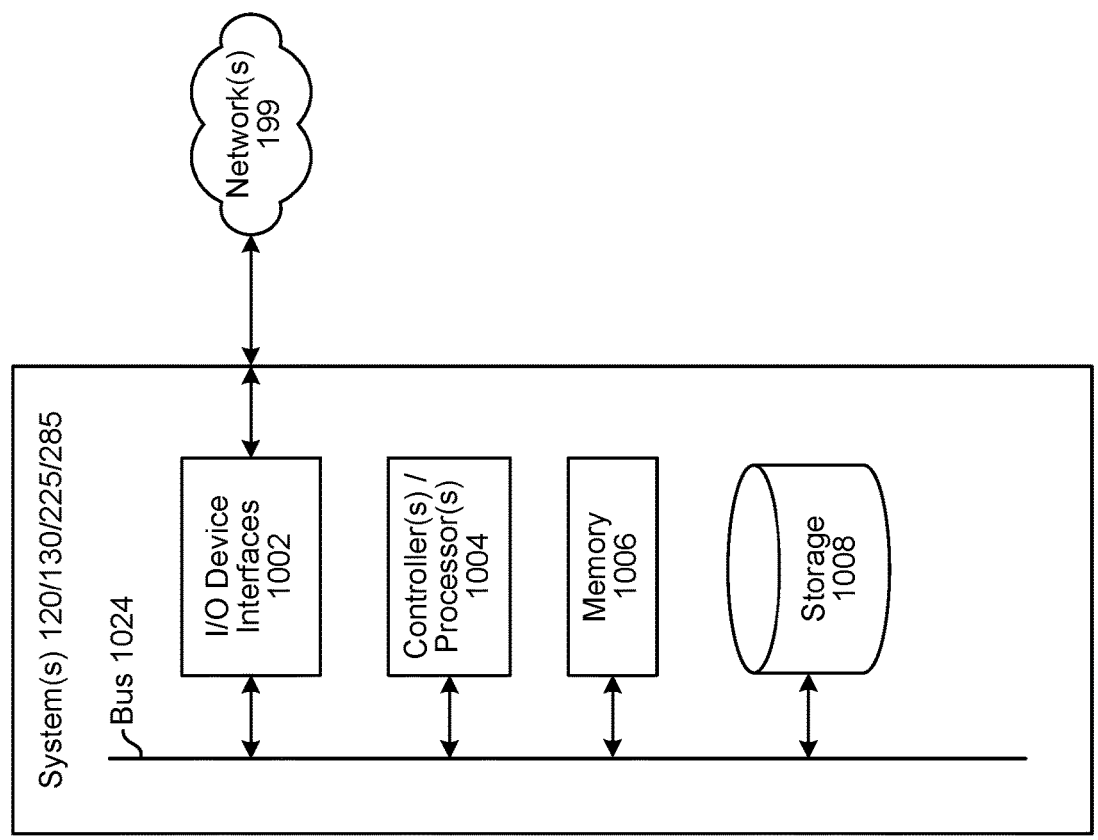
FIG. 10 is a block diagram conceptually illustrating example components of a system, according to embodiments of the present disclosure.

FIG. 9 is a block diagram conceptually illustrating a device 110 that may be used with the system 120. FIG. 10 is a block diagram conceptually illustrating example components of a remote device, such as the system 120 or a skill 225. A system (120/130/225/285) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/130/225/285) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/130/225/285) may be included in the system 100 of the present disclosure, such as one or more systems 120 and/or one or more skills 225. In operation, each of these systems may include computer-readable and computer-executable instructions that reside on the respective device (120/130/225/285), as will be discussed further below.

Each of these devices (110/120/130/225/285) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/130/225/285) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/130/225/285) may also be connected to removable or external non-volatile memory and/or storage (such as a removable memory card, memory key drive, networked storage, etc.) through respective input/output device interfaces (902/1002).

Computer instructions for operating each device (110/120/130/225/285) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/130/225/285) includes input/output device interfaces (902/1002). A variety of components may be connected through the input/output device interfaces (902/1002), as will be discussed further below. Additionally, each device (110/120/130/225) may include an address/data bus (924/1024) for conveying data among components of the respective device. Each component within a device (110/120/130/225/285) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system 120, the skill 225, and/or the notification system 285 may include their own dedicated processors, memory, and/or storage. Alternatively, one or more of the components of the device 110, the system 120, the skill 225, and/or the notification system 285 may utilize the I/O interfaces (902/1002), processor(s) (904/1004), memory (906/1006), and/or storage (908/1008) of the device 110, the system 120, the skill 225, or the notification system 285, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, the skill 225, and the notification system 285, as described herein, are illustrative, and may be located as a stand-alone device or may be included, in whole or in part, as a component of a larger device or system.

Figure 11:
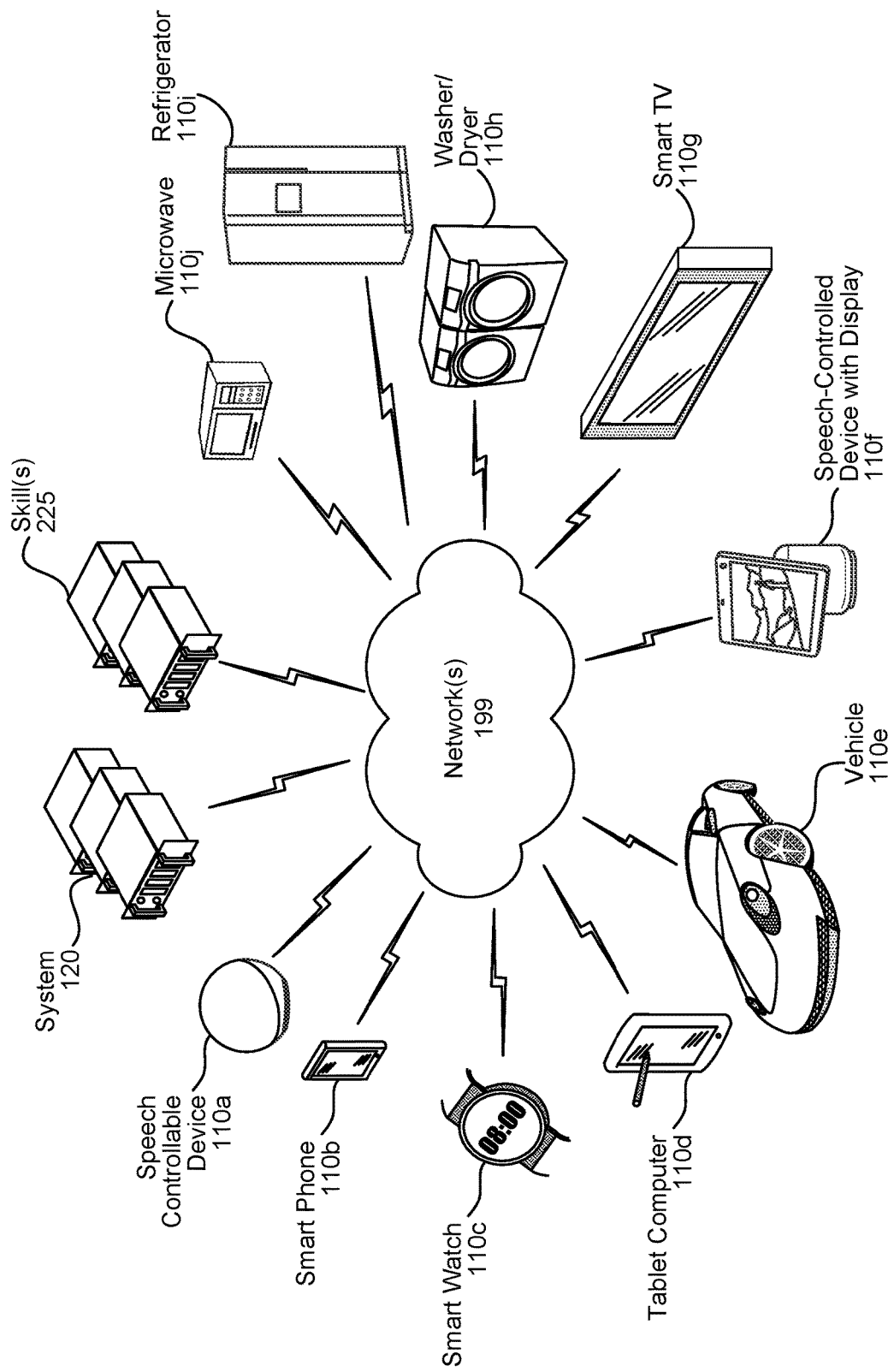
FIG. 11 illustrates an example of a computer network for use with the overall system, according to embodiments of the present disclosure.

As illustrated in FIG. 11, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 225, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, by a first computing system, first data representing first content to be output using a profile identifier, wherein the first data is received by the first computing system without a first user input requesting output of the first content;
   causing, by the first computing system, a first electronic device to output the first content;
   based on the first computing system causing the first electronic device to output the first content, storing, in a storage, second data indicating the first content was output using the profile identifier;
   receiving the first data by a second computing system, wherein the first data is received by the second computing system without a second user input requesting output of the first content;
   determining, by the second computing system, that the storage includes the second data; and
   determining, by the second computing system and based at least in part on the storage including the second data, that the second computing system is to refrain from using the first data to cause an electronic device to output the first content using the profile identifier.

2. The computer-implemented method of claim 1, further comprising:
   receiving, by the first computing system, third data representing second content to be output using the profile identifier, wherein the third data is received by the first computing system without a third user input requesting output of the second content;
   determining, by the first computing system, that the storage is missing fourth data representing the second content has been output using the profile identifier; and
   causing, by the first computing system, the second content to be output using the profile identifier based at least in part on determining the fourth data is missing from the storage.

3. The computer-implemented method of claim 1, further comprising:
   receiving, by the first computing system, third data representing second content to be output using the profile identifier, wherein the third data is received by the first computing system without a third user input requesting output of the second content;
   causing, by the first computing system, the first electronic device to indicate the second content is available for output; and
   by the second computing system and while the first computing system is causing the first electronic device to indicate the second content is available for output:
      receiving the third data for output using the profile identifier;
      determining the storage is missing fourth data representing the second content has been output using the profile identifier; and
      causing the first electronic device to output the second content based at least in part on determining the fourth data is missing from the storage.

4. The computer-implemented method of claim 1, further comprising:
   receiving, by the first computing system, third data representing second content to be output using the profile identifier, wherein the third data is received by the first computing system in response to receiving a third user input requesting output of the second content; and
   causing, by the first computing system and prior to causing the first electronic device to output the first content, the first electronic device to indicate the second content is available for output based at least in part on the first computing system receiving the third data in response to the third user input requesting output of the second content.

5. A computer-implemented method comprising:
   receiving, by a first computing system, first data representing first content to be output using a profile identifier, wherein the first data is received by the first computing system without a first user input requesting output of the first content;
   causing, by the first computing system, a first electronic device to output the first content;
   based on the first computing system causing the first electronic device to output the first content, storing, in a storage, second data indicating the first content was output using the profile identifier;
   receiving, by a second computing system, third data representing second content to be output using the profile identifier, wherein the third data is received by the second computing system without a second user input requesting output of the second content;
   determining, by the second computing system, that the storage is missing fourth data indicating the second content was output using the profile identifier; and
   causing, by the second computing system, the second content to be output using the profile identifier based at least in part on determining the storage is missing the fourth data.

6. The computer-implemented method of claim 5, wherein causing the first electronic device to output the first content comprises:
   determining the first electronic device is associated with the profile identifier;
   causing the first electronic device to indicate the first content is available for output;
   receiving a third user input requesting output of the first content; and
   causing the first electronic device to output the first content based at least in part on receiving the third user input.

7. The computer-implemented method of claim 6, further comprising:
- receiving fifth data representing third content to be output in response to receiving a fourth user input requesting output of the third content, the third content corresponding to the profile identifier; and
- causing the first electronic device to indicate the first content is available for output based at least in part on receiving the fifth data.

8. The computer-implemented method of claim 5, further comprising:
- receiving, by the first computing system, fifth data representing third content to be output using the profile identifier, wherein the fifth data is received by the first computing system without a third user input requesting output of the third content;
- causing, by the first computing system, the first electronic device to indicate the third content is available for output;
- determining, by the second computing system and after the first computing system causes the first electronic device to indicate the third content is available for output but prior to the first computing system causing the first electronic device to output the third content, that the storage is missing sixth data indicating the third content was output using the profile identifier; and
- causing, by the second computing system, the third content to be output using the profile identifier based at least in part on determining the storage is missing the sixth data.

9. The computer-implemented method of claim 5, further comprising:
- receiving fifth data representing third content to be output using the profile identifier, wherein the fifth data is received without a third user input requesting output of the third content;
- receiving sixth data representing fourth content to be output using the profile identifier, wherein the sixth data is received in response to a fourth user input requesting output of the fourth content;
- causing the first electronic device to indicate the fourth content is available for output;
- after causing the first electronic device to indicate the fourth content is available for output, receiving a fifth user input requesting output of the fourth content;
- determining negative user feedback data associated with the profile identifier;
- determining the negative user feedback data indicates a content publisher;
- determining the third content was received from the content publisher; and
- outputting the fourth content without the third content.

10. The computer-implemented method of claim 5, further comprising:
- receiving fifth data representing third content to be output using a device identifier, wherein the fifth data is received without a third user input requesting output of the third content;
- determining the storage is missing sixth data indicating the third content was output using the device identifier; and
- causing the third content to be output using the device identifier based at least in part on determining the storage is missing the sixth data.

11. The computer-implemented method of claim 5, further comprising:
- receiving fifth data representing third content to be output using the profile identifier, wherein the fifth data is received without a third user input requesting output of the third content;
- determining, in the storage, a timestamp representing when the third content was output using the profile identifier; and
- causing the third content to be output using the profile identifier based at least in part on the timestamp.

12. A computing system comprising:
- at least one processor; and
- at least one memory comprising instructions that, when executed by the at least one processor, cause the computing system to:
  - receive, by a first computing system, first data representing first content to be output using a profile identifier, wherein the first data is received by the first computing system without a first user input requesting output of the first content;
  - cause, by the first computing system, a first electronic device to output the first content;
  - based on the first computing system causing the first electronic device to output the first content, store, in a storage, second data indicating the first content was output using the profile identifier;
  - receive, by a second computing system, third data representing second content to be output using the profile identifier, wherein the third data is received by the second computing system without a second user input requesting output of the second content;
  - determine, by the second computing system, that the storage is missing fourth data indicating the second content was output using the profile identifier; and
  - cause, by the second computing system, the second content to be output using the profile identifier based at least in part on determining the storage is missing the fourth data.

13. The computing system of claim 12, wherein the at least one memory further comprises instructions that, when executed by the at least one processor, further cause the computing system to:
- determine the first electronic device is associated with the profile identifier;
- cause the first electronic device to indicate the first content is available for output;
- receive a third user input requesting output of the first content; and
- cause the first electronic device to output the first content based at least in part on receiving the third user input.

14. The computing system of claim 13, wherein the at least one memory further comprises instructions that, when executed by the at least one processor, further cause the computing system to:
- receive fifth data representing third content to be output in response to receiving a fourth user input requesting output of the third content, the third content corresponding to the profile identifier; and
- cause the first electronic device to indicate the first content is available for output based at least in part on receiving the fifth data.

15. The computing system of claim 12, wherein the at least one memory further comprises instructions that, when executed by the at least one processor, further cause the computing system to:
- receive, by the first computing system, fifth data representing third content to be output using the profile identifier, wherein the fifth data is received by the first computing system without a third user input requesting output of the third content;

cause, by the first computing system, the first electronic device to indicate the third content is available for output;

determine, by the second computing system and after the first computing system causes the first electronic device to indicate the third content is available for output but prior to the first computing system causing the first electronic device to output the third content, that the storage is missing sixth data indicating the third content was output using the profile identifier; and cause, by the second computing system, the third content to be output using the profile identifier based at least in part on determining the storage is missing the sixth data.

16. The computing system of claim 12, wherein the at least one memory further comprises instructions that, when executed by the at least one processor, further cause the computing system to:

receive fifth data representing third content to be output using the profile identifier, wherein the fifth data is received without a third user input requesting output of the third content;

receive sixth data representing fourth content to be output using the profile identifier, wherein the sixth data is received in response to a fourth user input requesting output of the fourth content;

cause the first electronic device to indicate the fourth content is available for output;

after causing the first electronic device to indicate the fourth content is available for output, receive a fifth user input requesting output of the fourth content;

determine negative user feedback data associated with the profile identifier;

determine the negative user feedback data indicates a content publisher;

determine the third content was received from the content publisher; and output the fourth content without the third content.

17. The computing system of claim 12, wherein the at least one memory further comprises instructions that, when executed by the at least one processor, further cause the computing system to:

receive fifth data representing third content to be output using a device identifier, wherein the fifth data is received without a third user input requesting output of the third content;

determine the storage is missing sixth data indicating the third content was output using the device identifier; and cause the third content to be output using the device identifier based at least in part on determining the storage is missing the sixth data.

18. The computing system of claim 12, wherein the at least one memory further comprises instructions that, when executed by the at least one processor, further cause the computing system to:

receive fifth data representing third content to be output using the profile identifier, wherein the fifth data is received without a third user input requesting output of the third content;

determine, in the storage, a timestamp representing when the third content was output using the profile identifier; and cause the third content to be output using the profile identifier based at least in part on the timestamp.

* * * * *